US009086312B2

(12) United States Patent
Nishihara

(10) Patent No.: US 9,086,312 B2
(45) Date of Patent: Jul. 21, 2015

(54) LIQUID CONSUMPTION DEVICE AND METHOD FOR CONTROLLING LIQUID CONSUMPTION DEVICE

(71) Applicant: SEIKO EPSON CORPORATION, Tokyo (JP)

(72) Inventor: Yuichi Nishihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 13/752,997

(22) Filed: Jan. 29, 2013

(65) Prior Publication Data

US 2013/0320247 A1 Dec. 5, 2013

(30) Foreign Application Priority Data

May 31, 2012 (JP) ................................. 2012-124299

(51) Int. Cl.
*B41J 2/175* (2006.01)
*G01F 23/292* (2006.01)

(52) U.S. Cl.
CPC ......... *G01F 23/2925* (2013.01); *B41J 2/17566* (2013.01); *G01F 23/2921* (2013.01)

(58) Field of Classification Search
CPC G01F 23/292; G01F 23/2922; G01F 23/2925

USPC ........ 250/573, 574, 576, 577, 900; 347/7, 85, 347/86, 92; 356/436, 440, 442
See application file for complete search history.

(56) References Cited

U.S. PATENT DOCUMENTS

| 5,072,595 | A | * | 12/1991 | Barbier | ............................ 62/129 |
| 6,012,795 | A | | 1/2000 | Saito et al. | |
| 6,361,136 | B1 | * | 3/2002 | Watanabe et al. | ................. 347/7 |

FOREIGN PATENT DOCUMENTS

JP 05-332812 A 12/1993

* cited by examiner

*Primary Examiner* — Kevin Pyo
(74) *Attorney, Agent, or Firm* — Global IP Counselors, LLP

(57) ABSTRACT

A printing device has a detecting section in which a light emitting section and a light receiving section are provided, liquid reservoirs for storing liquid in which a prism is provided to reflect light emitted from the light emitting section corresponding to a remaining state of the liquid, and a control section. The control section determines whether a process for air bubbles that is a process corresponding to an adhesion state of air bubbles in the prism is to be conducted or not based on a signal of light reception results obtained by receiving reflected light from the prism by the light receiving section.

9 Claims, 18 Drawing Sheets

LIQUID CONSUMPTION DEVICE AND METHOD FOR CONTROLLING LIQUID CONSUMPTION DEVICE

CROSS-REFERENCE TO THE RELATED APPLICATIONS

This application claims priority to Japanese Patent Application No. 2012-124299 filed on May 31, 2012. The entire disclosure of Japanese Patent Application No. 2012-124299 is hereby incorporated herein by reference

TECHNICAL FIELD

The present invention relates to a liquid consumption device, a method for controlling a liquid consumption device, and the like.

BACKGROUND ART

For example, Patent Document 1 discloses an ink detection device in which a light path member having a refractive index close to that of ink is provided in an ink cartridge, light from a light emitting section transmits from the light path member to the inside of ink in a case where ink is filled inside the light path member, and light from the light emitting section undergoes total reflection on an internal surface of the light path member in a case where there is no ink inside the light path member and then light that has undergone total reflection is detected by a light receiving section.

PRIOR ART DOCUMENTS

Patent Documents

[Patent Document 1] Japanese Laid-open Patent Publication No. H05-332812

SUMMARY OF THE INVENTION

Object the Invention is to Achieve

There is a possibility that air bubbles generated in liquid will adhere to a surface where the light path member (prism) and the liquid (ink) contact with each other. When air bubbles adhere, since part of light from the light emitting section undergoes total reflection at the boundary between the light path member and the air bubbles, there is a concern that false detection is caused with respect to detection of remaining liquid.

Several aspects of the present invention can provide a liquid consumption device, a method for controlling a liquid consumption device, and the like, that can conduct a process corresponding to an adhesion state of air bubbles in detection of remaining liquid.

Means of Achieving the Object

According to an aspect of the present invention, a liquid consumption device has a detecting section in which a light emitting section and a light receiving section are provided, a liquid reservoir for storing liquid in which a prism is provided to reflect light emitted from the light emitting section corresponding to a remaining state of the liquid, and a control section. The control section determines whether a process for air bubbles that is a process corresponding to an adhesion state of air bubbles in the prism is to be conducted or not based on a signal of light reception results obtained by receiving reflected light from the prism by the light receiving section.

With this aspect of the present invention, a signal of light reception results is obtained by receiving reflected light from the prism provided in the liquid reservoir by the light receiving section, and it is determined whether a process for air bubbles as a process corresponding to an adhesion state of air bubbles in the prism is to be conducted or not based on the signal of light reception results. Therefore, a process corresponding to an adhesion state of air bubbles in the prism becomes possible in detection of remaining liquid.

According to an aspect of the present invention, the control section may conduct peak detection of the signal of light reception results in each of a first measurement region and a second measurement region set based on a detection position of the prism, and may determine whether the process for air bubbles is to be conducted or not based on information regarding a distance between a first peak detected in the first measurement region and a second peak detected in the second measurement region.

With this aspect of the present invention, by detecting the first peak and the second peak, the adhesion state of air bubbles can be determined based on the information regarding the distance between the peaks. Also, the adhesion state of air bubbles can be determined if a peak due to air bubbles exists in at least one of the first measurement region and the second measurement region. Therefore, the adhesion state of air bubbles can be determined accurately even if the detection position of the prism is displaced from the actual position.

According to an aspect of the present invention, the light receiving section may receive reflected light from an incidence plane that is a plane where light from the light emitting section enters the prism, and light that enters the inside of the prism through the incidence plane and is reflected from the inside of the prism corresponding to the adhesion state of air bubbles. The control section may determine that the process for air bubbles is to be conducted in a case where the control section judges that the distance between the first peak and the second peak is smaller than a distance between two peaks generated by reflected light from the incidence plane.

With this aspect of the present invention, since the distance between the first peak and the second peak changes corresponding to the adhesion state of air bubbles in the prism, the adhesion state of air bubbles can be determined by comparing the distance between two peaks generated by reflected light from the incidence plane with the distance between the first peak and the second peak.

According to an aspect of the present invention, the liquid consumption device may include a holder in which an opening portion is provided in a position that faces the incidence plane of the prism in a case where the liquid reservoir is installed, a driving section that moves the holder and the detecting section relatively along a direction in which the light emitting section and the light receiving section are arranged, and a light shielding section that divides the opening portion into a first opening portion and a second opening portion along a direction in which the holder and the detecting section are moved relatively. The two peaks generated by reflected light from the incidence plane may be a peak obtained by reflection of emitted light from the light emitting section to the first opening portion on the incidence plane and a peak obtained by reflection of emitted light from the light emitting section to the second opening portion on the incidence plane.

With this aspect of the present invention, the opening of the holder can be divided into the first opening portion and the second opening portion by the light shielding section. Therefore, two peaks can be generated, that is, the peak obtained by reflection of emitted light from the light emitting section to the first opening portion on the incidence plane and the peak obtained by reflection of emitted light from the light emitting section to the second opening portion on the incidence plane.

According to an aspect of the present invention, the liquid consumption device may include a plurality of liquid reservoirs as the liquid reservoir, and the control section may determine an adhesion state of air bubbles in the prism with respect to each liquid reservoir of the plurality of liquid reservoirs. Then, the control section may determine that the process for air bubbles is to be conducted in a case where the control section determines that air bubbles adhere to the prism with respect to at least one liquid reservoir of the plurality of liquid reservoirs, and in the process for air bubbles, control for adjusting a light emission amount of the light emitting section can be conducted based on the signal of light reception results with respect to a liquid reservoir of the plurality of liquid reservoirs in which it is determined that no air bubbles adhere to the prism.

With this aspect of the present invention, the signal of light reception results of a liquid reservoir in which it is determined that air bubbles adhere to the prism can be excluded from a target of the control for adjusting a light emission amount of the light emitting section. Therefore, adjustment of the light emission amount that is not affected by adhesion of air bubbles can be achieved.

According to an aspect of the present invention, the control section may conduct peak detection to the signal of light reception results with respect to a liquid reservoir of the plurality of liquid reservoirs in which it is determined that no air bubbles adhere to the prism, and may conduct control for adjusting the light emission amount based on a detected peak value.

With this aspect of the present invention, control for adjusting the light emission amount can be conducted only based on a peak value of the signal of light reception results with respect to a liquid reservoir in which it is determined that no air bubbles adhere to the prism.

According to an aspect of the present invention, the control section may determine the adhesion state of air bubbles in the prism at a predetermined timing. Then, in a case where the control section newly determines that no air bubbles adhere to the prism with respect to a liquid reservoir in which it has been previously determined that air bubbles adhere to the prism, the control section may include the signal of light reception results with respect to the liquid reservoir in which it is newly determined that no air bubbles adhere to the prism as the target of the control for adjusting a light emission amount of the light emitting section.

With this aspect of the present invention, even if air bubbles adhere to the prism once, if the air bubbles disappear later, the process can be returned from the process for air bubbles to a normal process with respect to the liquid reservoir in which air bubbles disappear.

According to an aspect of the present invention, the control section may determine the remaining state of the liquid stored in the liquid reservoir based on the signal of light reception results and an estimated remaining amount of the liquid stored in the liquid reservoir.

According to an aspect of the present invention, the control section may make a preliminary determination on whether the liquid stored in the liquid reservoir is in a near end state or not by comparing the signal of light reception results and a threshold value. In a case where the control section makes a preliminary determination that the liquid stored in the liquid reservoir is in a near end state, the control section may make a determination whether the estimated remaining amount reaches a predetermined value or not, and in a case where the control section makes a determination that the estimated remaining amount reaches the predetermined value, the control section may make a final determination that the liquid stored in the liquid reservoir is in a near end state.

With these aspects of the present invention, the remaining state of the liquid can be determined based on the estimated remaining amount of the liquid as well as the signal of light reception results. Therefore, even if there is a possibility that the near end state is falsely detected by comparing the signal of light reception results and the threshold value, the near end state can be determined accurately by determining whether the estimated remaining amount reaches the predetermined value or not.

According to another aspect of the present invention, a method for controlling a liquid consumption device that includes a detecting section in which a light emitting section and a light receiving section are provided, and a liquid reservoir for storing liquid in which a prism is provided, the method including receiving reflected light from the prism, that reflects light emitted from the light emitting section corresponding to a remaining state of the liquid, by the light receiving section, determining whether a process for air bubbles that is a process corresponding to an adhesion state of air bubbles in the prism is to be conducted or not based on a signal of light reception results obtained by light reception of the light receiving section, and conducting the process for air bubbles in a case where it is determined that the process for air bubbles is to be conducted.

DETAILED DESCRIPTION OF THE EMBODIMENTS

Hereinafter, a preferred embodiment of the present invention will be described in detail. However, the present embodiment described below does not unreasonably limit the subject matter of the present invention defined in the claims, and all the elements explained in the present embodiment are not necessarily essential as the means for achieving the object of the present invention.

1. Basic Configuration of Printing Device, Ink Cartridge

Figure 1:
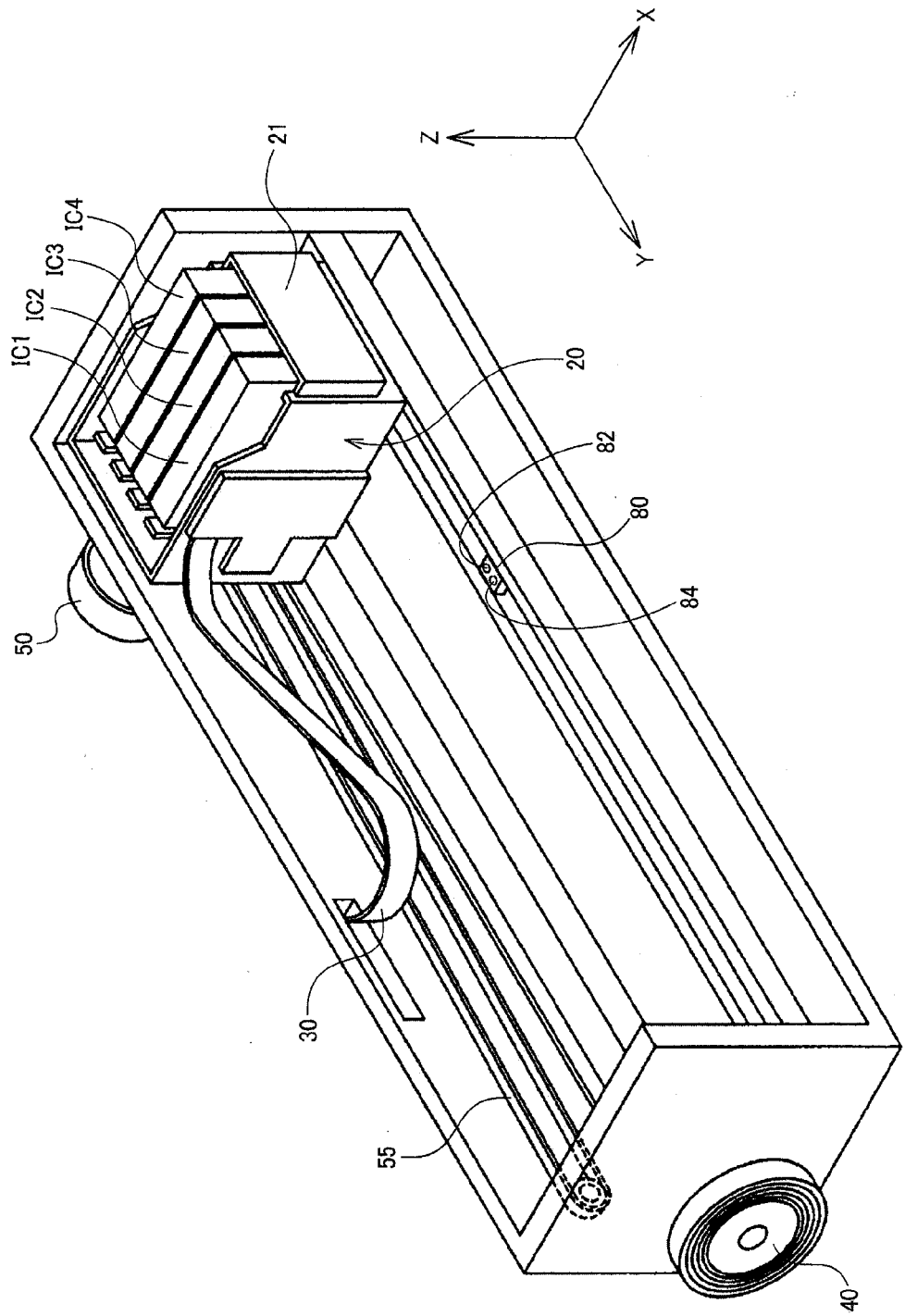
[FIG. 1] A basic configuration example of a printing device according to the present invention.

FIG. 1 is a perspective view that illustrates a main part of a printing device (liquid consumption device) according to the present invention. The printing device of FIG. 1 includes ink cartridges IC1-IC4 (liquid reservoir), a carriage 20 that is provided with a holder 21 for accommodating the ink cartridges IC1-IC4 in a removable manner, a cable 30, a paper feed motor 40, a carriage motor 50 (driving section), a carriage driving belt 55, and a detecting section 80. Here, the holder 21 and the carriage 20 may be formed as a unitary member. Alternatively, the holder 21 and the carriage 20 may be formed as a separate member, and the holder 21 may be attached to the carriage 20.

Ink (liquid, printing material) of one color is stored in the ink cartridges IC1-IC4, respectively. The ink cartridges IC1-IC4 are attached to the holder 21 in a removable manner. A head is provided in a surface of the carriage 20 in a −Z direction. Ink supplied from the ink cartridges IC1-IC4 is ejected from the head toward a recording medium (for example, printing paper). Hereinafter, a case where the recording medium is printing paper will be explained as an example. The carriage 20 is connected to a control section (control section 100 of FIG. 8 described below) with the cable 30, and ejection control is conducted by the control section via the cable 30. The paper feed motor 40 drives a paper feed roller (paper feed roller 45 of FIG. 8 described below) by rotation, and feeds paper in an X direction shown in FIG. 1. The carriage motor 50 drives the carriage driving belt 55, and moves the carriage 20 in a ±Y direction. The control section controls the ejection, the paper feeding, and the movement of the carriage 20, and thereby a printing operation is conducted.

Hereinafter, the ±Y direction of moving the carriage 20 is referred to as a "main scanning direction", and the X direction of feeding printing paper is referred to as a "sub scanning direction".

The detecting section 80 outputs a signal for detecting a remaining state of ink in the ink cartridges IC1-IC4. Specifically, the detecting section 80 includes a light emitting section 82 (light emitting element) that emits light to a prism (prism 320 of FIG. 2 described below) provided in the ink cartridges IC1-IC4, and a light receiving section 84 (light receiving element) that receives reflected light from the prism and converts it into an electrical signal. For example, the light emitting section 82 is constructed by an LED (light emission diode), and the light receiving section 84 is constructed by a photo transistor. The detailed configuration of the detecting section 80 will be described later with reference to FIG. 18.

Figure 2:
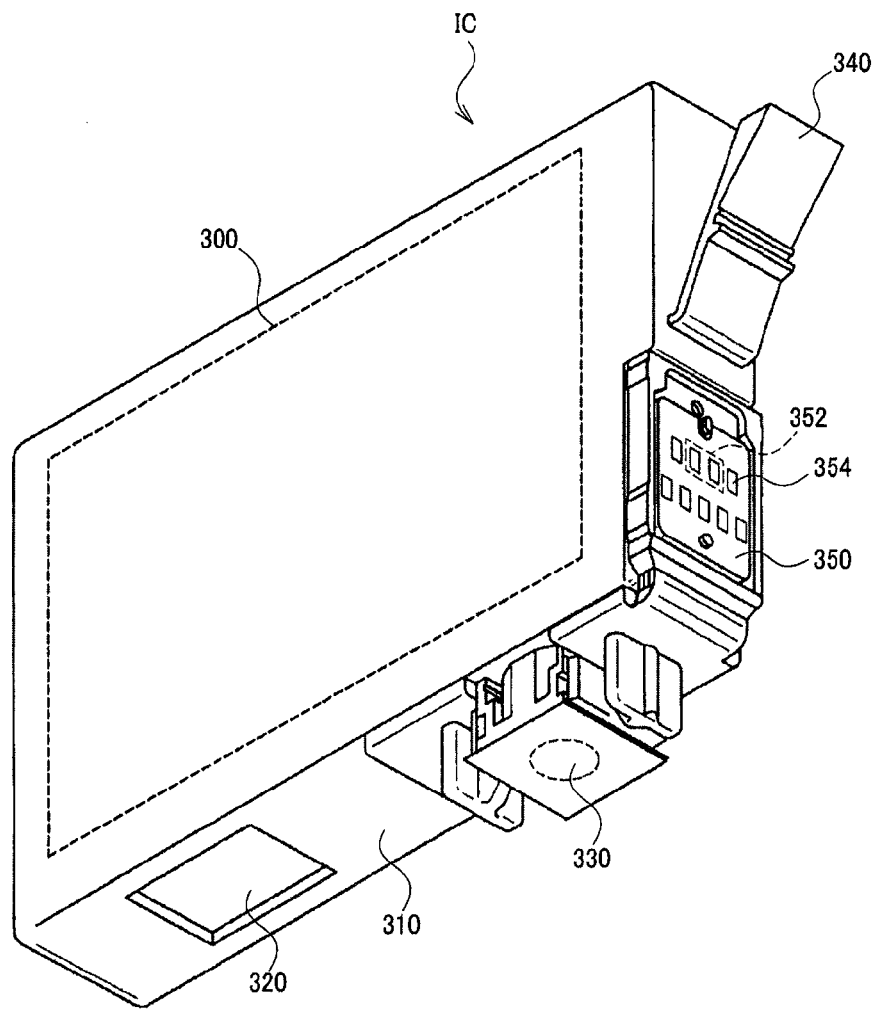
[FIG. 2] A configuration example of an ink cartridge.

FIG. 2 is a perspective view that illustrates a main part of the ink cartridges IC1-IC4. The ink cartridge IC illustrated in FIG. 2 corresponds to each ink cartridge of the ink cartridges IC1-IC4 illustrated in FIG. 1.

The ink cartridge IC includes an ink storing section 300 that is a cuboid (including a substantially cuboid shape) for storing ink, a circuit board 350 (substrate), a lever 340 for attaching the ink cartridge IC to the holder 21 and removing the ink cartridge IC from the holder 21, an ink supply port 330 that supplies ink to the head, and the prism 320 that is provided in a bottom surface 310 of the ink cartridge IC. A memory device 352 for storing information regarding the ink cartridge IC is installed on a back surface of the circuit board 350. A plurality of terminals 354 are provided on a front surface of the circuit board 350, and the plurality of terminals 354 are to be electrically connected with the memory device 352. When the ink cartridge IC is attached to the holder 21, the plurality of terminals 354 are electrically connected with a control section of a main body, that is described below, through a plurality of terminals of the main body provided in the holder 21. As the memory device 352, a non-volatile memory such as an EEPROM can be used.

The prism 320 is made of a member transparent with respect to light from the light emitting section 82. For example, the prism 320 is made of polypropylene. The prism 320 is provided such that an incidence plane where light from the light emitting section 82 enters is exposed from the bottom surface 310 of the ink cartridge IC. The bottom surface 310 is a surface that faces the −Z direction side when the ink cartridge IC is attached to the holder 21 of FIG. 1. An opening is formed in the holder 21, so that light from the light emitting section 82 is allowed to enter the incidence plane of the prism 320. Specifically, when the carriage 20 provided with the holder 21 moves in the main scanning direction (±Y direction) of FIG. 1, the ink cartridges IC1-IC4 sequentially move in the +Y direction or the −Y direction above the detecting section 80 (+Z direction), and reflected light from the prism 320 of each ink cartridge is received by the light receiving section 84. Specifically, the detecting section 80 outputs light reception results of the light receiving section 84 in response to light emission from the light emitting section 82 as a sensor output signal corresponding to the position of the carriage 20. In the present embodiment, an ink near end state of each ink cartridge is detected based on a signal of light reception results that is the sensor output signal corresponding to the position of the carriage 20.

Here, the ink near end state refers to a state in which a remaining amount or a liquid surface level of ink stored in the ink storing section 300 becomes equal to or lower than a predetermined value and only a small amount of ink is left in the ink cartridge IC. For example, the ink near end state is a state in which an air shot where the head does not eject ink might occur when printing is continued after the ink near end state is detected and then an ink consumption amount estimated by a remaining amount estimation section 160 described below with reference to FIG. 8 exceeds a predetermined amount.

2. Method for Detecting Ink Near End State

Figure 3:
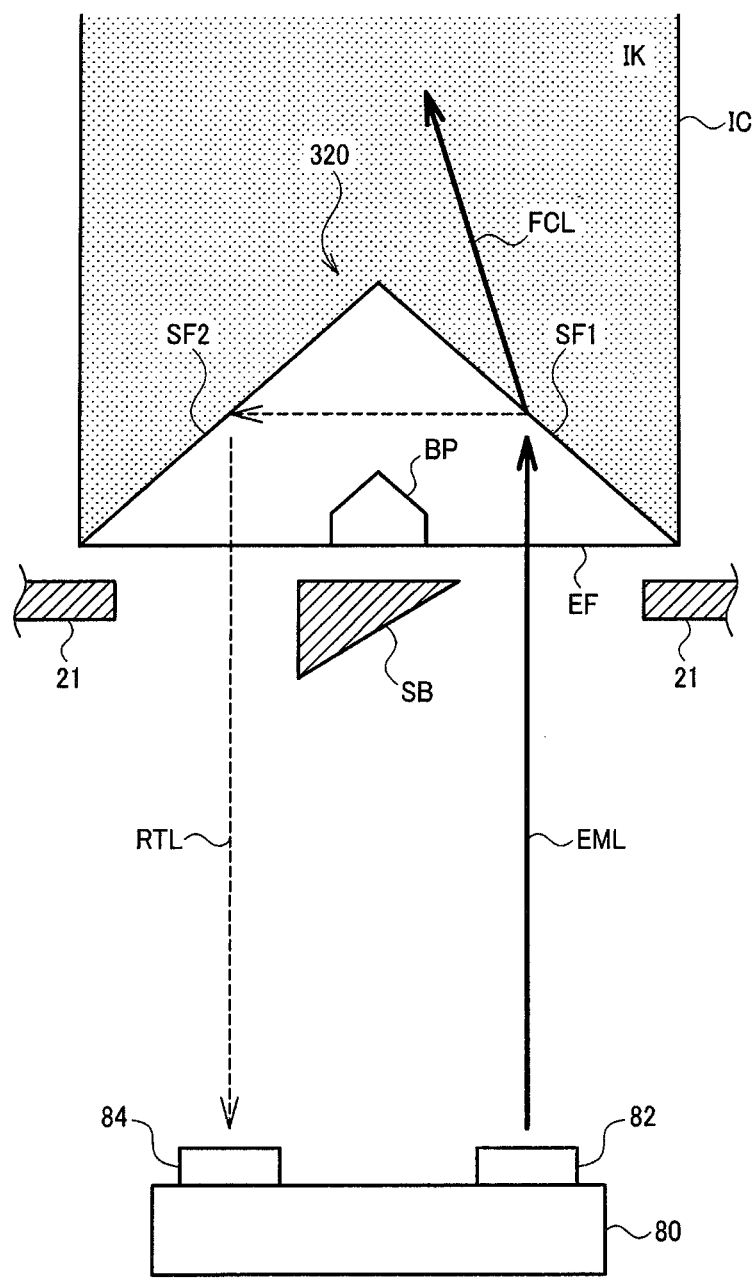
[FIG. 3] A diagram that explains a method for detecting an ink near end state.

A method for detecting an ink near end state will be described with reference to FIG. 3 to FIG. 7. FIG. 3 is a cross-sectional view of a YZ plane that passes through the prism 320 of the ink cartridge IC. Also, FIG. 3 illustrates a state in which the positional relationship between the prism 320 and the detecting section 80 becomes a positional relationship that makes detection of an ink near end state possible.

A bore portion BP is provided in the incidence plane EF so as to control deformation that is caused when the prism 320 is formed. The opening is provided in the holder 21 such that the incidence plane EF and the detecting section 80 face each other through the opening when the ink cartridge IC is attached to the holder 21. Slant faces SF1 and SF2 of the prism 320 face the inside of the ink storing section 300, and the slant faces SF1 and SF2 contact ink IK when the ink storing section 300 is filled with ink IK. For example, the slant face SF1 is orthogonal to the slant face SF2, and the slant face SF1 and the slant face SF2 are arranged so as to be symmetrical with respect to a flat plane parallel to an XZ plane of FIG. 1.

As shown in FIG. 3, when the ink cartridge IC is filled with ink IK, light EML entering the prism 320 from the light emitting section 82 enters the ink IK from the slant face SF1 (light FCL). In such a case, since light RTL reflected on the slant face SF1 and the slant face SF2 becomes very small, the light receiving section 84 receives hardly any light. For example, the critical angle for total reflection on the slant face SF1 and the slant face SF2 is approximately 64 degrees on the assumption that the refractive index of the ink is 1.5 which is substantially similar to that of water and the prism 320 is made of polypropylene. Since the incidence angle is 45 degrees, total reflection will not occur on the slant face SF1 and the slant face SF2, and the light EML enters the ink IK.

Figure 4:
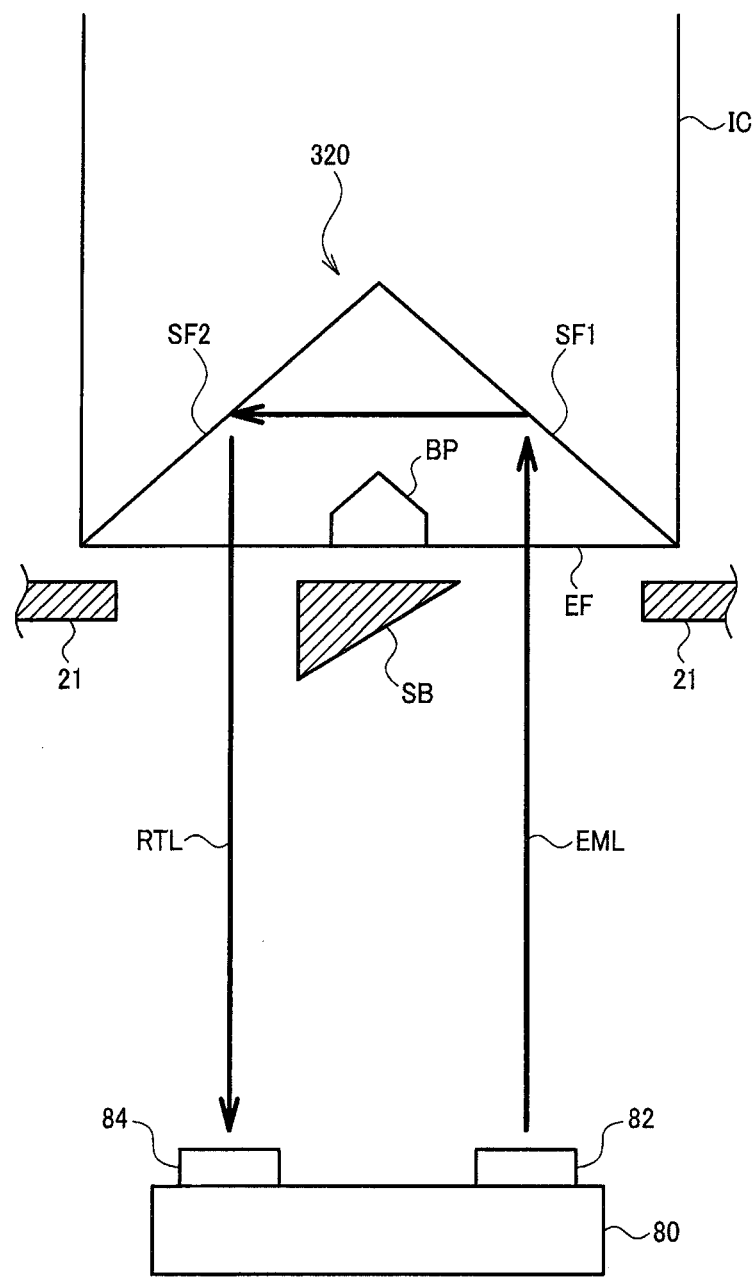
[FIG. 4] A diagram that explains the method for detecting an ink near end state.

FIG. 4 shows a case where the ink cartridge IC is not filled with ink IK because the ink IK in the ink cartridge IC is consumed for printing, and portions of the slant face SF1 and the slant face SF2 where light from the light emitting section 82 enters contact air. In such a case, light EML entering the prism 320 from the light emitting section 82 undergoes total reflection on the slant face SF1 and the slant face SF2, and exits from the incidence plane EF to the outside of the prism 320 again (light RTL). Since the light receiving section 84 receives the light RTL that has undergone total reflection, a strong signal of light reception results can be obtained. For example, the critical angle for total reflection on the slant face SF1 and the slant face SF2 is approximately 43 degrees in a case where the refractive index of air is 1 and the prism 320 is made of polypropylene. Since the incidence angle is 45 degrees, the light EML will undergo total reflection on the slant face SF1 and the slant face SF2.

Figure 5:
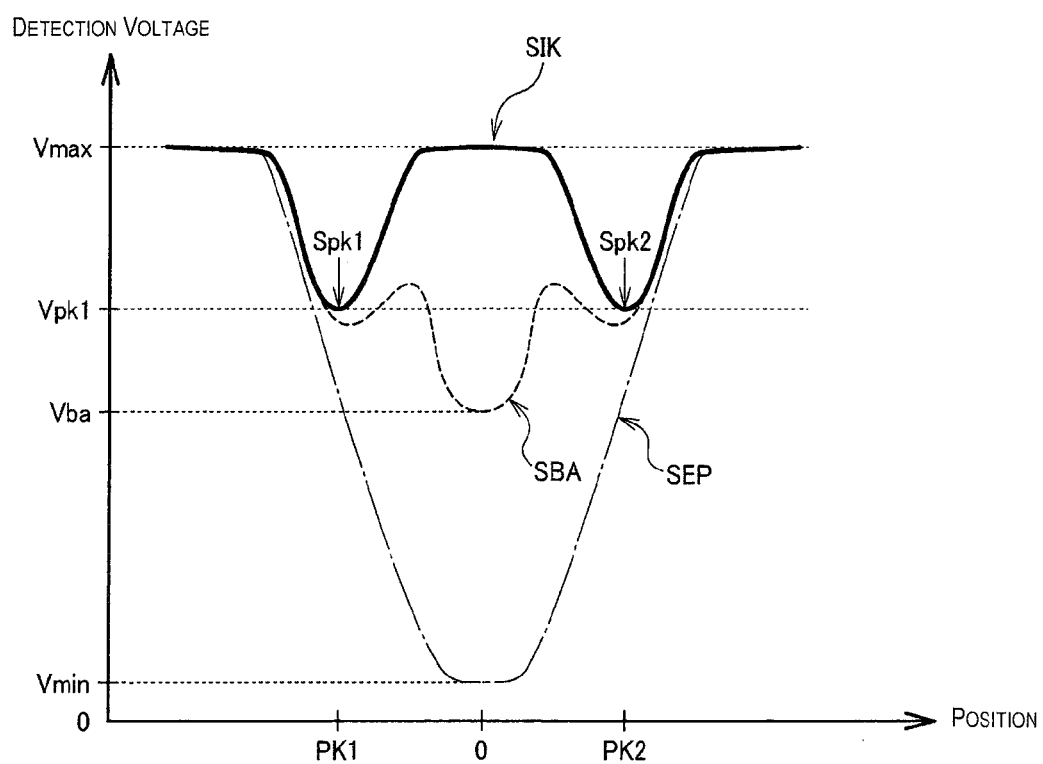
[FIG. 5] An example of characteristics of a detection voltage.

FIG. 5 illustrates an example of characteristics of a detection voltage when one ink cartridge passes over the detecting section 80. The horizontal axis of FIG. 5 represents a relative position between the prism 320 and the detecting section 80. The vertical axis represents the detection voltage output from the detecting section 80 in each position of the horizontal axis. In FIG. 5, as the light reception amount of the light receiving section 84 approaches zero, the detection voltage (signal of light reception results) gets close to an upper limit voltage Vmax. Also, as the light reception amount of the light receiving section 84 increases, the detection voltage gets close to a lower limit voltage Vmin. When the light reception amount exceeds a predetermined value, the detection voltage is saturated and becomes the lower limit voltage Vmin. The lower limit voltage Vmin corresponds to a lower limit voltage of a voltage range output from the light receiving section 84 to a collector terminal as described below with reference to FIG. 18.

As shown in FIG. 5, the detection voltage of the detecting section 80 changes depending on the relative position between the detecting section 80 and the prism 320. Also, as shown in a detection voltage SIK of FIG. 5, since the light reception amount of the light receiving section 84 is small in a case where the ink cartridge IC is filled with the ink IK as explained with reference to FIG. 3, the detection voltage gets close to Vmax in a position "0". Here, the position "0" is a position in which the center of the prism 320 and the center of the detecting section 80 coincide with each other in the main scanning direction (for example, the positional relationship between the ink cartridge IC and the detecting section 80 shown in FIG. 3). The center of the detecting section 80 is a center between the light emitting section 82 and the light receiving section 84 in the main scanning direction. Peaks Spk1 and Spk2 are generated in positions pk1 and pk2 where the relative position of the center of the prism 320 and the center of the detecting section 80 is displaced from the position "0" in the main scanning direction due to reflected light from the incidence plane EF of the prism. The peaks Spk1 and Spk2 will be described below with reference to FIG. 6.

As shown in a detection voltage SEP, since the light reception amount of the light receiving section 84 is large in a case where the ink cartridge IC is not filled with the ink IK as explained with reference to FIG. 4, the detection voltage reaches (or gets close to) Vmin in the position "0". As described above, the characteristics of the detection voltage are very different depending on whether the ink cartridge IC is filled with the ink IK or not. In the present embodiment, an ink near end state of the ink cartridge is detected by detecting the difference in the characteristics of the detection voltage.

Specifically, based on a peak value Vpk1 of the detection voltage SIK, a threshold value is set between the peak value Vpk1 and the lower limit voltage Vmin. While the ink cartridge IC is in a detection position that passes over the detecting section 80 (+Z direction of FIG. 1), in a case where the detection voltage of the detecting section 80 is smaller than the threshold value, it is determined as the ink near end state, and in a case where the detection voltage is equal to or greater than the threshold value, it is determined that ink remains.

Figure 6:
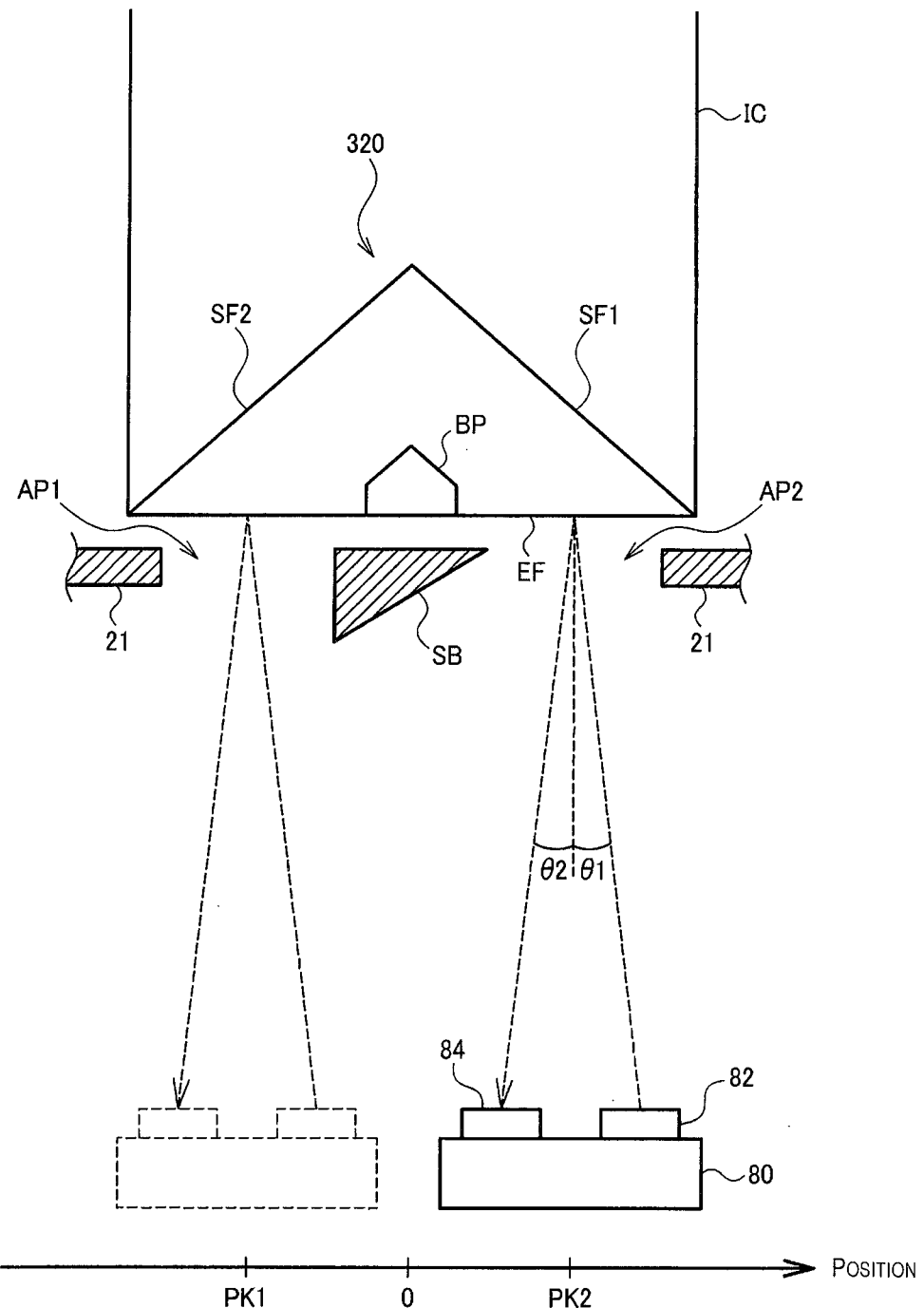
[FIG. 6] A diagram that explains a peak generated by reflected light from an incidence plane of a prism.

Next, the peaks Spk1 and Spk2 will be described with reference to FIG. 6. As shown in FIG. 6, the opening is provided in the holder 21 corresponding to the prism 320, and a light shielding section SB is provided in the center of the opening such that light from the light emitting section 82 is shielded. The center of the opening refers to a position that corresponds to the center of the prism 320 when the ink cartridge IC is attached to the holder 21. The light shielding section SB is provided along a direction (X axis direction) that intersects with the main scanning direction, and divides the opening of the holder 21 into a first opening AP1 and a second opening AP2 arranged along the main scanning direction.

Part of light, entering the incidence plane EF of the prism from the light emitting section 82, is reflected and then received by the light receiving section 84. Specifically, the light receiving section 84 receives light in which an incidence angle θ1 from the light emitting section 82 to the incidence plane EF and an incidence angle θ2 from the incidence plane EF to the light receiving section 84 are equal to each other. Since the light shielding section SB is located in the position "0", reflected light from the incidence plane EF is not detected as shown in SIK of FIG. 5. Also, since the openings AP1 and AP2 are located in the positions PK1 and PK2, the peaks Spk1 and Spk2 of FIG. 5 are detected. Here, the position PK1 is a position in which the center of the opening AP1 and the center of the detecting section 80 coincide with each other in the main scanning direction, and the position PK2 is a position in which the center of the opening AP2 and the center of the detecting section 80 coincide with each other in the main scanning direction. Although reflected light from the incidence plane EF is detected in a case where light totally reflected from the prism 320 comes back, the peaks Spk1 and Spk2 do not occur because they are buried in a signal of totally reflected light as shown in SEP.

3. Characteristics of Detection Voltage when Air Bubbles Adhere

Figure 7:
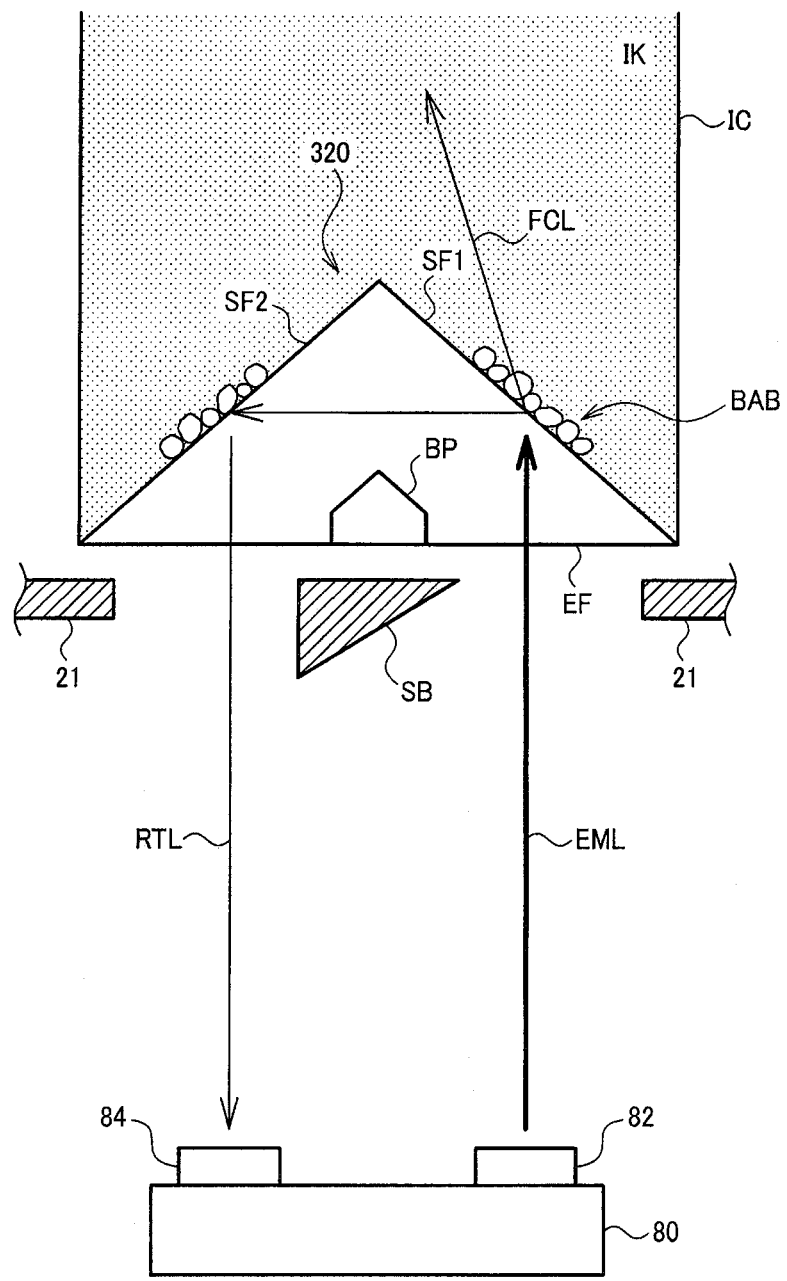
[FIG. 7] A diagram that explains reflected light from the prism in a case where air bubbles adhere.

As shown in FIG. 7, there is a possibility that air bubbles BAB will adhere to the slant faces SF1 and SF2 in a case where the prism 320 and the ink IK contact each other. Since a water repellent treatment (for example, application of a water repellent agent) has been conducted to the slant faces SF1 and SF2 of the prism 320, the ink IK will be repelled when the ink IK runs out. Therefore, once air bubbles adhere while being filled with the ink IK, the air bubbles are hard to remove due to the water repellent treatment. For example, if air bubbles adhere to the prism 320 when a user drops the ink cartridge IC to the floor and then the ink cartridge IC is attached to the holder 21 in this state, detection of an ink near end state will be conducted in the state where the air bubbles adhere.

When the air bubbles BAB adhere to the slant faces SF1 and SF2, the slant faces SF1 and SF2 contact air in the portion where the air bubbles BAB adhere. Therefore, even if the ink cartridge IC is filled with the ink IK, part of the entering light EML undergoes total reflection on the slant faces SF1 and SF2, and is received by the light receiving section 84. In such a case, as shown in SBA of FIG. 5, a peak due to totally reflected light is generated in the characteristics of the detection voltage in the position "0". A peak value Vba of this peak depends on the adhesion state of air bubbles, and the peak becomes large (the peak value Vba becomes small) as more air bubbles adhere to portions of the slant faces SF1 and SF2 where the entering light EML hits.

As described above, if the characteristics of the detection voltage change due to adhesion of air bubbles, there is a possibility that a near end state will be falsely detected. Specifically, as explained with reference to FIG. 5, an ink near end state is detected by judgment of a threshold value. However, due to the peak caused by adhesion of air bubbles, it is difficult to distinguish from the detection voltage SEP in a case where there is no ink IK. For example, as described below with reference to FIG. 16 and the like, detection of an ink near end state is conducted at a predetermined timing such as a timing when the power of the printing device is turned on or a timing when the cartridge is replaced. Also, the threshold value is set with respect to the ink cartridge in which it is determined that ink exists in the previous detection of an ink near end state based on a minimum value of the detection voltage (Vpk1 or Vpk2 in a case where ink exists without air bubbles (SIK) in FIG. 5) in each ink cartridge. Therefore, the threshold value is set based on Vba of FIG. 5 in a case where air bubbles adhere. When the peak due to air bubbles is large and Vba is equal to Vmin, the threshold value is set to Vmin that is the lower limit voltage. In such a case, even if the ink IK runs out and totally reflected light comes back from the prism 320, there is a possibility that the detection voltage will not fall below the threshold value because the threshold value is set to the lower limit voltage. Therefore, even in a case where there is no ink, it may be determined that it is not an ink near end state.

Also, as described below with reference to FIG. 15 and the like, in the present embodiment, the light emission amount of the light emitting section 82 is controlled such that the minimum value of the detection voltage (Vpk1 or Vpk2 in a case where ink exists without air bubbles (SIK) in FIG. 5) is in a predetermined voltage range. When the light emission amount is controlled including the ink cartridge in which air bubbles adhere, a peak value PKbab of FIG. 15 becomes a minimum value, and thus the light emission amount is controlled such that the peak value PKbab is in a predetermined voltage range of VRG1-VRG2. Then, the light emission amount is controlled to be too small and a sufficient light emission amount cannot be obtained, which might result in failure of detection of an ink near end state. For example, the detecting section 80 will get dirty as time passes due to ink mist that is sprayed at the time of injecting ink from the head and the like. As the dirt accumulates, the S/N of the detection voltage will be deteriorated. Further, when the light emission amount is controlled too much as described above, a large peak cannot be obtained even if total reflection occurs. Consequently, it is assumed that an ink near end state cannot be detected.

Thus, according to the present embodiment, an adhesion state of air bubbles is determined based on the detection voltage (signal of light reception results), and a process for air bubbles is conducted when it is determined that air bubbles adhere. The process for air bubbles is an ink near end state detection process or a light emission amount control process that is different from a case where air bubbles do not adhere, for example.

4. Detailed Configuration of Printing Device

Figure 8:
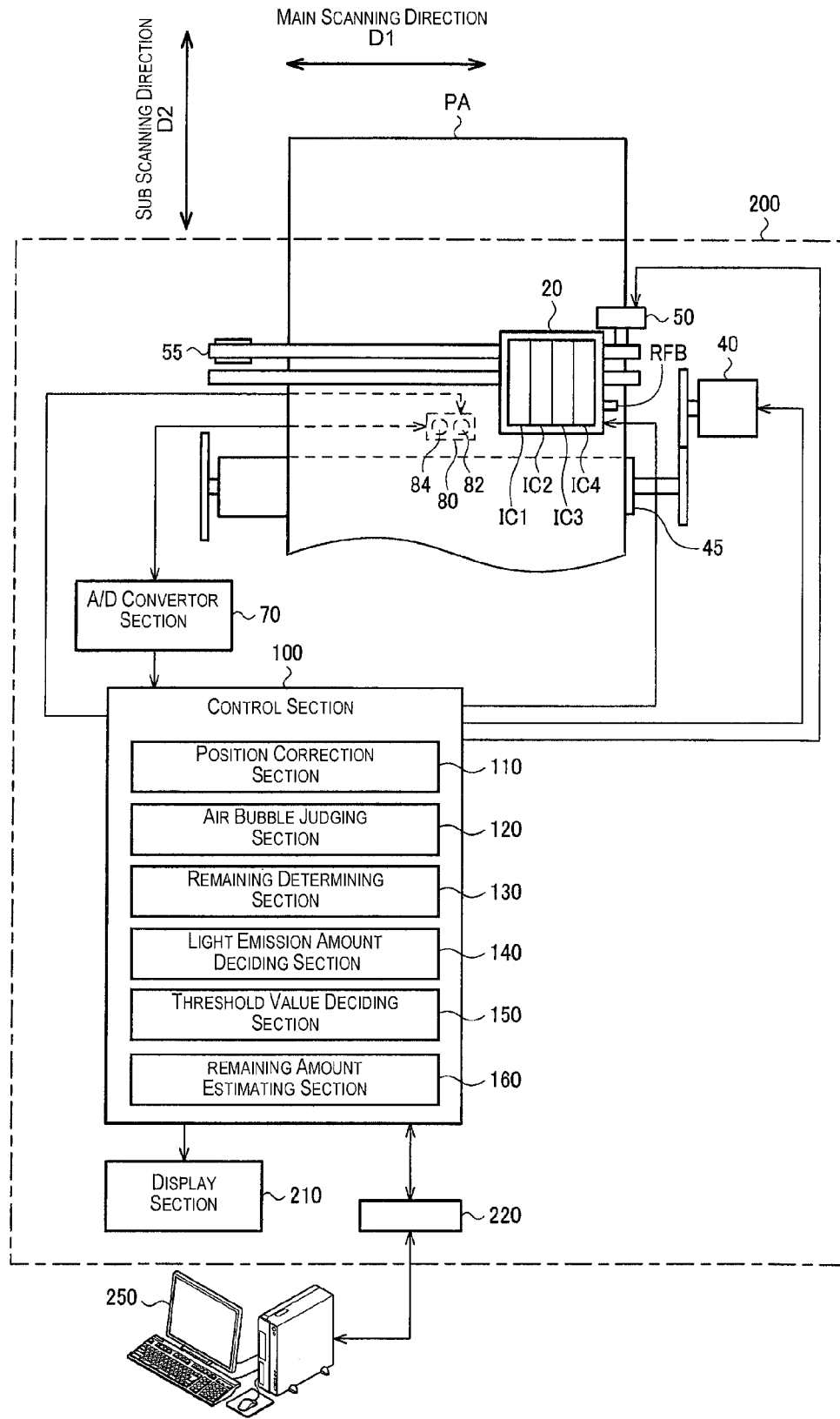
[FIG. 8] A detailed configuration example of the printing device according to the present invention.

FIG. 8 illustrates a detailed configuration example of the printing device according to the present embodiment. In FIG. 8, the main scanning direction is shown by D1, and the sub scanning direction is shown by D2.

The printing device 200 of FIG. 8 includes the ink cartridges IC1-IC4, the carriage 20 that is provided with the holder 21 for accommodating the ink cartridges IC1-IC4 in a removable manner, the paper feed motor 40, the paper feed roller 45, the carriage motor 50, the carriage driving belt 55, an A/D convertor section 70, the detecting section 80, the control section 100, a display section 210, and an interface section 220. Here, the same elements as the elements of FIG. 1 are given the same reference numerals, and the explanations thereof will be omitted as appropriate.

The control section 100 receives image data from a personal computer 250 through the interface section 220, and conducts control of printing the image to printing paper PA. The control section 100 has a position correcting section 110, an air bubble judging section 120, a remaining determining section 130, a light emission amount deciding section 140, a threshold value deciding section 150, and a remaining amount estimating section 160. The control section 100 has a CPU, for example, and decompresses a control program stored in a ROM, that is not shown in the drawing, in a RAM, that is not shown in the drawing. The control program is executed by the CPU, and thereby each section of the control section 100 is operated.

The position correcting section 110 corrects the position of the carriage 20 in the main scanning direction D1 from a detection voltage signal. Specifically, the position correcting section 110 conducts a process to determine the position of a failure detecting plate RFB provided in the holder 21 from measurement results of the detection voltage, and correct an estimated position of the center of the prism that is necessary for detection of air bubbles. More specifically, a rotary encoder is mounted to the carriage motor 50, and the position correcting section 110 corrects the position of the center of the prism that corresponds to a rotation number counted by the rotary encoder. This is because there is attachment tolerance of the carriage 20 or attachment tolerance of the failure detecting plate RFB to the holder 21 as described below. The position correction will be described in detail below with reference to FIG. 9.

The air bubble judging section 120 judges existence or non-existence (adhesion state) of air bubbles with respect to each cartridge based on the detection voltage (signal of light reception results) from the detecting section 80. The detection voltage from the detecting section 80 is A/D converted by the A/D convertor section 70, and is input to the control section 100 as a digital signal. More specifically, the detection voltage is obtained as a plurality of detection voltages (sampling voltages) at predetermined position intervals. For example, when one cartridge passes over the detecting section 80, several tens of sampling voltages are obtained.

The remaining determining section 130 determines whether it is an ink near end state or not with respect to each ink cartridge based on the detection voltage sampled in the A/D convertor section 70. With respect to the ink cartridge in which it is determined that it is an ink near end, the control section 100 outputs an order to the display section 210 of the printing device 200 or a display section of the personal computer 250 to display an alarm for indicating ink replacement, and encourages a user to replace the ink cartridge.

Here, the remaining amount estimating section 160 may determine that the ink cartridge is empty in a case where a predetermined amount of ink is consumed after the remaining determining section 130 determines that it is an ink near end state, and it may be configured such that printing is not conducted until the ink cartridge is replaced. Alternatively, it may be determined that the ink cartridge is empty in a case where the remaining determining section 130 determines that it is an ink near end state, and it may be configured such that printing is not conducted until the ink cartridge is replaced.

The light emission amount deciding section 140 conducts a process for deciding the light emission amount of the light emitting section 82 based on the detection voltage from the detecting section 80 and the judgment results regarding existence or non-existence of air bubbles. The control section 100 controls a PWM signal of FIG. 18 based on the decided light emission amount, and controls the light emission amount of the light emitting section 82. This process for deciding the light emission amount is conducted with the air bubble judging process and the threshold value deciding process prior to the detection of an ink near end state, and the detection of an ink near end state is conducted by using the adjusted light emission amount.

The remaining amount estimating section 160 estimates the remaining amount of ink in each ink cartridge. More specifically, the remaining amount estimating section 160 counts the number of ink drops injected from the printing head, calculates the used amount of ink by cumulating the counted number of ink drops and the mass per ink drop, and estimates the remaining amount of ink by subtracting the calculated used amount of ink from an initial filling amount of ink in each ink cartridge. The remaining amount estimating section 160 records the estimated remaining amount of ink on the memory device 352 that is provided in each ink cartridge as appropriate. For example, when the printing device 200 is started, the remaining amount estimating section 160 acquires the remaining amount of ink from the memory device 352 of each ink cartridge, and stores it in the RAM, that is not shown in the drawing, of the control section 100. While the power is on, the value in the RAM is renewed in accordance with execution of printing or cleaning of the printing head. Then, for example, every time the power of the printing device 200 is turned off, each ink cartridge is replaced, or a predetermined amount of ink is consumed, the renewed estimated remaining amount is written back to the memory device 352 of each ink cartridge. Hereinafter, a case of estimating a remaining amount of ink will be described as an example. However, the present embodiment is not limited to this, and various amounts of ink such as a consumed amount of ink may be estimated.

The threshold value deciding section 150 sets a threshold value for determining an ink near end state based on the detection voltage of the detecting section 80. As described below, the threshold value is decided irrespective of the judgment results of existence or non-existence of air bubbles. The remaining determining section 130 conducts a process such that an ink near end state is not falsely detected based on the remaining amount of ink even in a case where the detection voltage exceeds the threshold value due to adhesion of air bubbles.

5. Method for Detecting Air Bubbles

Next, a method for detecting air bubbles in the present embodiment will be described with reference to FIG. 9-FIG. 12. First, the position correcting process and the range of acquiring the detection voltage will be described.

Figure 9:
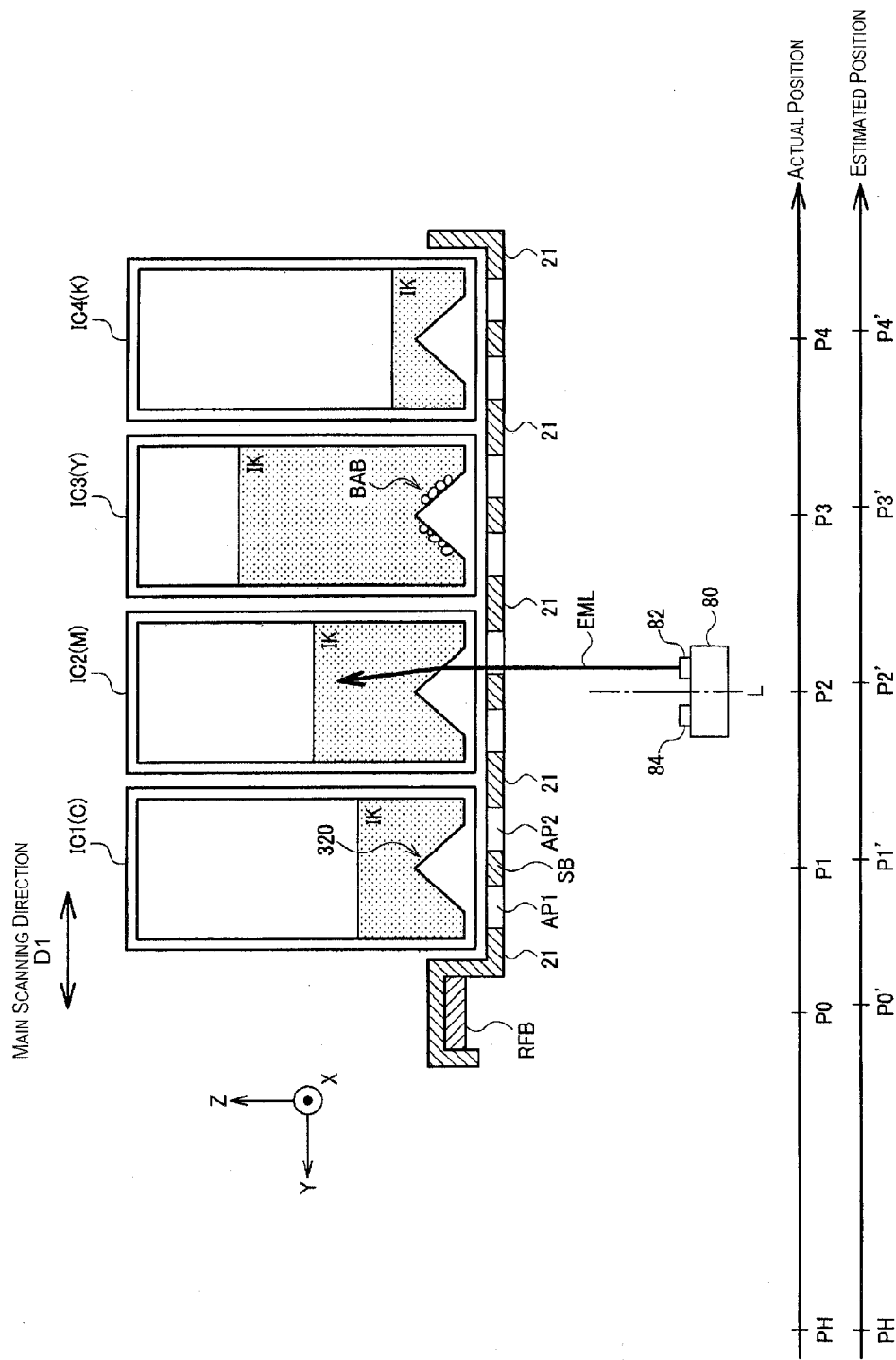
[FIG. 9] A diagram that explains an estimated position of a carriage.

As shown in FIG. 9, when the carriage 20 is moved from the home position PH in the main scanning direction D1 and the carriage 20 is located in a position P0, the failure detecting plate RFB is irradiated with light from the light emitting section 82. The failure detecting plate RFB is provided to detect a failure of the detecting section 80. In a case where the detecting section 80 cannot detect reflected light from the failure detecting plate RFB, the control section 100 determines that there is a failure in the detecting section 80. When the carriage 20 is moved to positions P1-P4, the prism of each of the ink cartridges IC1-1C4 is irradiated with light from the light emitting section 82. The ink cartridges IC1-1C4 are filled with ink of C (cyan), M (magenta), Y (yellow), or K (black), respectively, for example. The air bubble judging section 120 detects air bubbles in each of CMYK.

As described above with reference to FIG. 8, the position correcting section 110 grasps the position of the carriage 20 based on the output of the rotary encoder. However, due to attachment tolerance and the like of the carriage 20 to the printing device, there is a possibility that the position of the carriage 20 grasped by the position correcting section 110 based on the output of the rotary encoder will be displaced from the actual position of the carriage 20. For example, the position displacement will occur due to attachment tolerance of the failure detecting plate RFB, or various tolerance such as the inclination of the carriage 20, the error of the rotary encoder, the response speed of an electronic circuit (for example, the detecting section 80), or mechanical position displacement (for example, by driving the carriage). The position correcting section 110 conducts a correction process of correcting such displacement based on the detection voltage obtained by measuring reflection from the failure detecting plate RFB. Hereinafter, the corrected position is referred to as estimated positions P0'-P4'. The detection voltage in the estimated position P0' of the rotary encoder is actually a detection voltage in the position P0.

Specifically, the position correcting section 110 sets the center of the characteristics of the detection voltage of the failure detecting plate RFB (center between two positions in which the detection voltage crosses a predetermined threshold) to the estimated position P0'. More specifically, the position of the failure detecting plate RFB grasped by the position correcting section 110 is corrected to a newly estimated position P0'. Since the relationship between the position of the failure detecting plate RFB and the position of the center of the prism in each ink cartridge can be known from design data of the holder 21, the position of the center of the prism in each ink cartridge is corrected by correcting the position P0' using the home position PH as a reference. In sum, the position correcting section 110 sets the positions P1'-P4' in which the center of the prism in each ink cartridge is located based on the design value of the holder 21 and the corrected value P0' of the failure detecting plate RFB using the home position PH as a reference.

However, even when the position correcting process is conducted in this manner, the corrected positions P0'-P4' and the actual positions do not always coincide with each other due to attachment tolerance of the failure detecting plate RFB, tolerance of the holder 21, tolerance of the position of prism on the ink cartridge, manufacturing tolerance of the carriage 20, or the like. Hereinafter, the corrected positions P0'-P4' are also referred to estimated positions, when appropriate.

Figure 10:
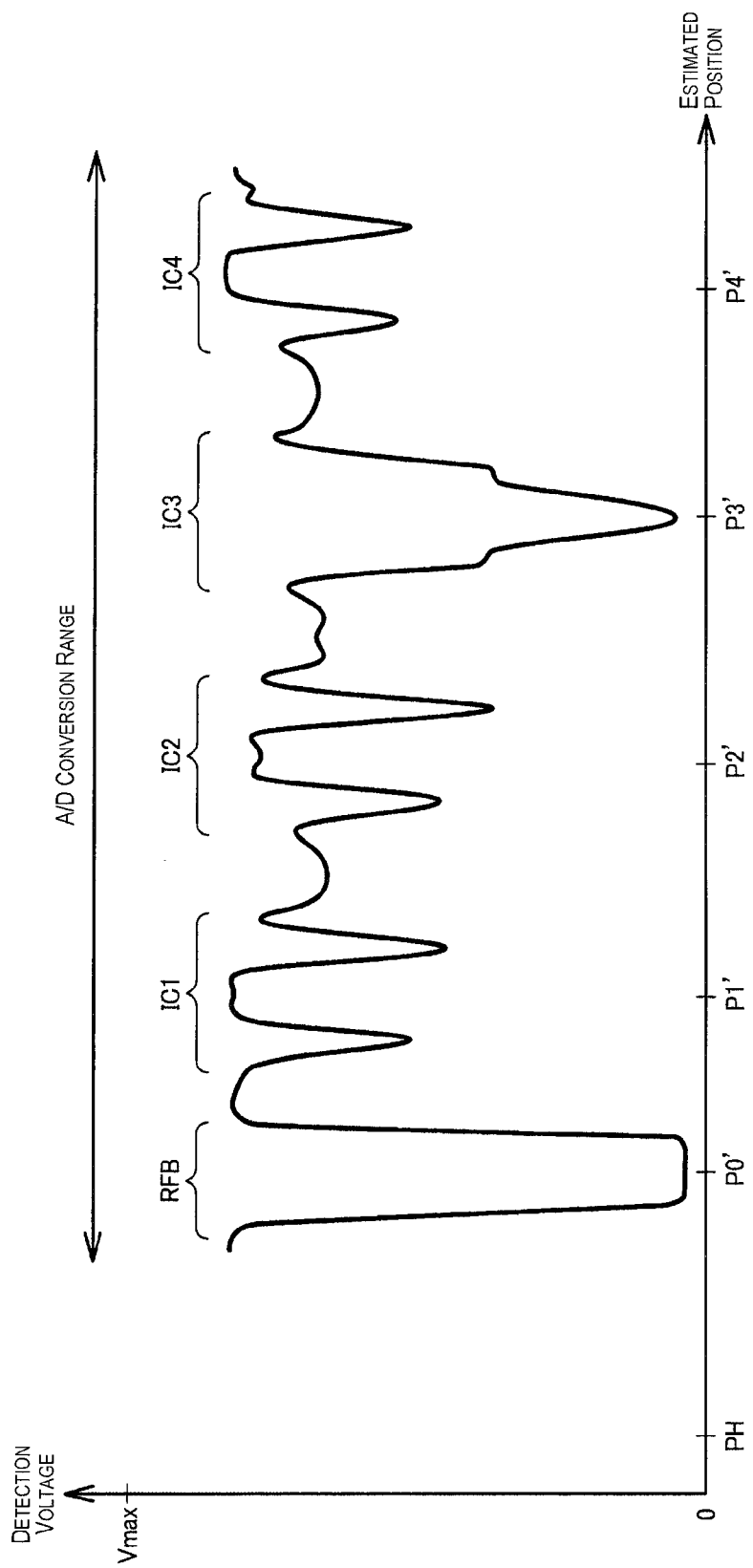
[FIG. 10] A diagram that explains an A/D conversion range of the detection voltage and a correction process of the estimated position.

As shown in FIG. 10, when the carriage 20 passes through a predetermined position range using the home position PH as a reference, the A/D convertor section 70 conducts A/D conversion to the detection voltage. The estimated position of the carriage 20 is corrected by the position correcting section 110, and the predetermined position range using the home position PH as a reference is set based on the corrected estimated position of the carriage 20. The A/D conversion signal in this predetermined position range is used for detection of air bubbles and detection of an ink near end state.

Figure 11:
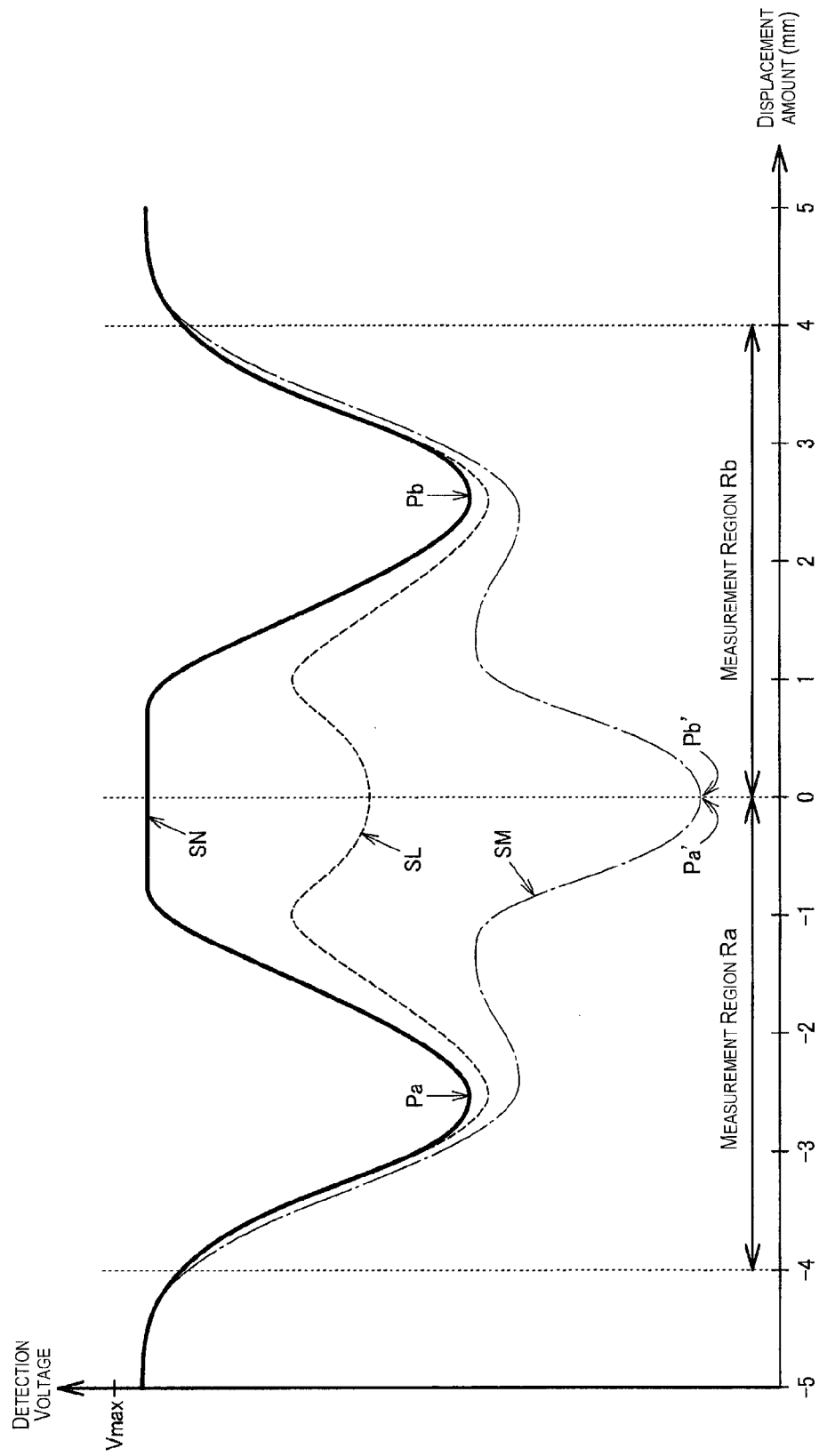
[FIG. 11] A diagram that explains a method for detecting air bubbles.

Next, a method for detecting air bubbles will be described. FIG. 11 shows an example of the characteristics of the detection voltage in a case where there is no displacement between the estimated position and the actual position. In FIG. 11, the characteristics of the detection voltage of one ink cartridge are shown, and the "displacement amount" in the horizontal axis represents the displacement amount between the position corrected by the position correcting section 110 and the actual position.

As shown in FIG. 11, a first measurement region Ra and a second measurement region Rb are set using the estimated position (any one of P1'-P4') of the center of the prism as a boundary. The width of the measurement regions Ra and Rb is 4 mm, for example, and is set corresponding to the size of the prism 320 and the size of the opening of the holder 21. Next, in each measurement region, a peak hold process of the detection voltage is conducted so as to acquire a minimum value (peak value) of the detection voltage and the position in which the minimum value is obtained. The interval (difference) of the positions in which the minimum values are obtained is calculated, and it is determined that there are air bubbles in a case where the interval is smaller than a predetermined value. The determined value is set to a distance that is smaller than a distance between the center of the opening AP1 and the center of the opening AP2 described above with reference to FIG. 6. For example, in a case where the distance between the two openings is 5 mm, the predetermined value is set to 4 mm, for example.

As shown in the detection voltage SN, in a case where the prism 320 is soaked in ink and no air bubbles adhere to the prism 320, a minimum value Pa is obtained in the measurement region Ra and a minimum value Pb is obtained in the measurement region Rb by light reflected on the incidence plane EF of the prism. In such a case, the interval between the positions in which the minimum values Pa and Pb are detected is 5 mm, and this is larger than the above predetermined value. Therefore, the air bubble judging section 120 determines that no air bubbles adhere to the prism. Also, as shown in the detection voltage SL, in a case where a small number of air bubbles adhere to the prism 320, the interval between the positions in which the minimum values Pa and Pb are detected is approximately 5 mm, and the air bubble judging section 120 determines that no air bubbles adhere to the prism 320.

As shown in SM, as more air bubbles adhere to the prism 320, the peak of the detection voltage by air bubbles becomes large. In a case where the peak becomes larger than the minimum values Pa and Pb in which no air bubbles adhere, the minimum values in the measurement regions Ra and Rb become Pa' and Pb' which are peak values by air bubbles. The interval between the positions in which the minimum values Pa' and Pb' are detected is 0 mm, and this is smaller than the predetermined value of 4 mm. Therefore, the air bubble judging section 120 determines that air bubbles adhere to the prism 320.

Figure 12:
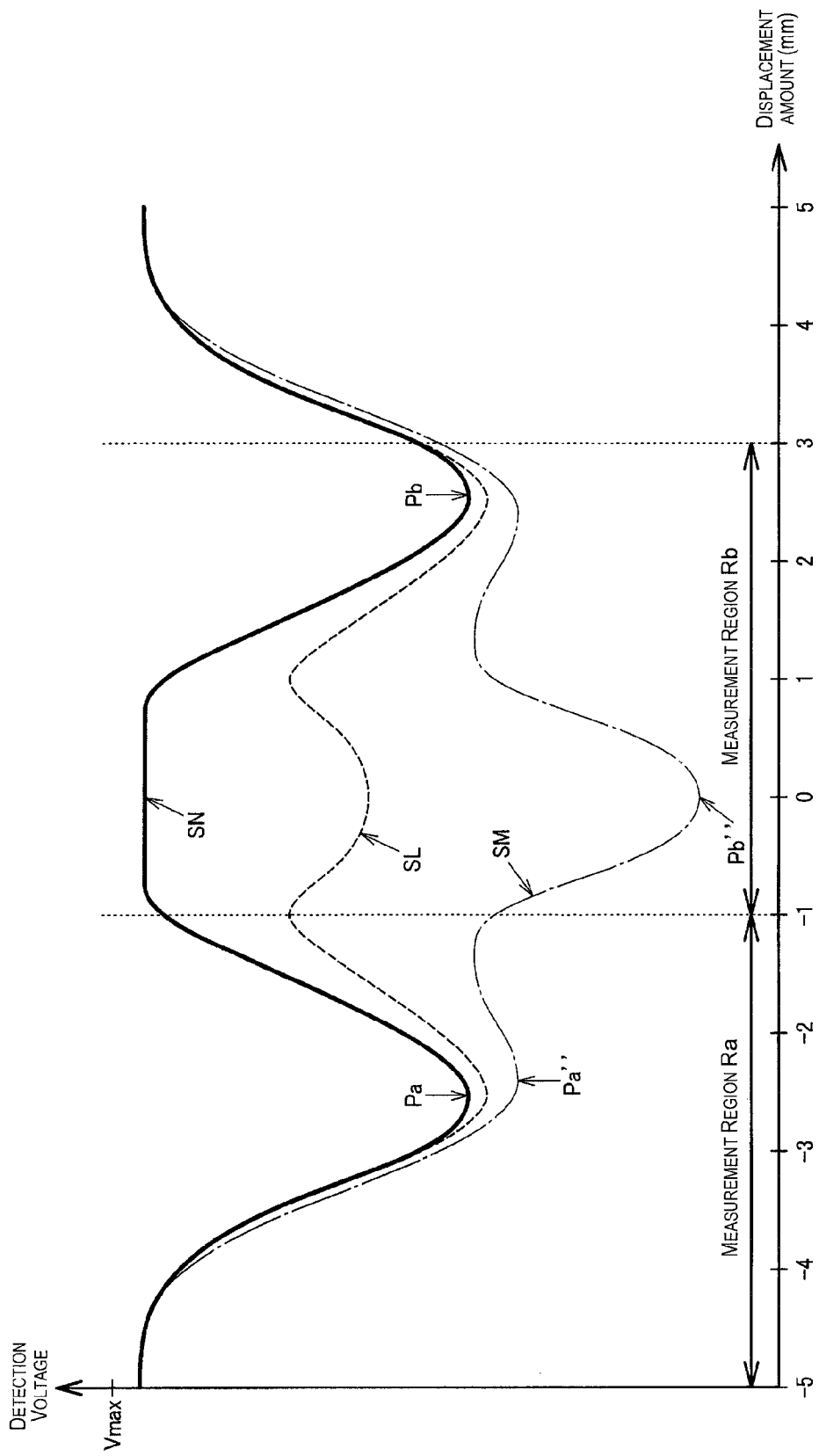
[FIG. 12] A diagram that explains the method for detecting air bubbles.

FIG. 12 shows an example of the characteristics of the detection voltage in a case where the position corrected by the position correcting section 110 and the actual position are displaced by 1 mm. In this example, the actual position of the center of the prism is a position in which the displacement amount is 0 mm, and the estimated position is displaced in a position in which the displacement amount is −1 mm. As shown in SN of FIG. 12, in a case where no air bubbles adhere to the prism 320, the minimum values Pa and Pb are obtained in the measurement regions Ra and Rb. Since the interval of the peaks is 5 mm, the air bubble judging section 120 determines that no air bubbles adhere to the prism. Also, as shown in SL, in a case where a small number of air bubbles adhere to the prism 320, the air bubble judging section 120 determines that no air bubbles adhere to the prism 320.

As shown in SM, when a lot of air bubbles adhere to the prism 320, the peak by air bubbles belongs to the measurement region Rb. Therefore, a peak value Pa" by the incidence plane EF of the prism becomes a minimum value in the measurement region Ra, and a peak value Pb" by air bubbles becomes a minimum value in the measurement region Rb. Since the peak by air bubbles is substantially the center between the peaks (Pa, Pb) by the incidence plane EF of the prism, the interval between the positions in which the minimum values Pa" and Pb" are detected is approximately 2.5 mm. The air bubble judging section 120 determines that air bubbles adhere to the prism 320 because the interval between the peaks is smaller than the predetermined value of 4 mm.

As described above, the two measurement regions Ra and Rb are set using the position of the center of the prism corrected by the position correcting section 110 as a boundary, and a peak by the incidence plane EF of the prism is assumed in each measurement region. Then, highly accurate detection of air bubbles becomes possible by detecting a peak in each measurement region. Specifically, in a case where the distance between the peaks is smaller than the distance between the peaks by the incidence plane EF of the prism, it can be considered that the peak by air bubbles is larger than the peak by the incidence plane EF of the prism, and therefore, adhesion of air bubbles can be judged eventually by examining the distance between the peaks. As shown in SL of FIG. 12, in a case where the peak by air bubbles is smaller than the peak by the incidence plane EF of the prism, there is no influence on control of the light emission amount or setting of the threshold value, and therefore, it is not determined that air bubbles adhere in such a case according to the present embodiment. In sum, in the process of detecting air bubbles of the present embodiment, it is eventually determined whether or not the peak by air bubbles is larger than the peak by the incidence plane EF of the prism rather than whether or not there are air bubbles.

According to the above-described embodiment, the printing device includes the detecting section 80 in which the light emitting section 82 and the light receiving section 84 are provided, the ink cartridges IC1-IC4 for storing ink IK in which the prism 320 reflects light emitted from the light emitting section 82 depending on the remaining state of the ink, and the control section 100. The control section 100 determines whether the process for air bubbles that is a process corresponding to the adhesion state of air bubbles in the prism 320 is to be conducted or not based on the detection voltage obtained by receiving reflected light from the prism 320 by the light receiving section 84.

As described with reference to FIG. 7, in a case where air bubbles BAB adhere to the prism 320, and the peak of the detection voltage by the air bubbles (Vba of FIG. 5) is larger than the peak by reflected light from the incidence plane EF of the prism 320 (Vpk1), there is a possibility that an ink near end state is falsely detected. According to the present embodiment, however, since the adhesion state of air bubbles in the prism 320 can be determined, false detection of an ink near end state can be prevented by conducting the process for air bubbles in a case where it is determined that air bubbles adhere to such an extent that air bubbles affect detection of an ink near end state.

Here, the remaining state of ink is not limited simply to a state in which the ink cartridge is filled with ink and a state in which the ink cartridge is completely empty. For example, as described with reference to FIG. 3 and FIG. 4, in a case where the reflection state of the prism 320 changes due to the liquid surface level of ink, change in the remaining state will be detected when the liquid surface level is lower than a level that changes the reflection state. In such a case, the remaining state shows whether or not the liquid surface level is lower than the level that changes the reflection state, and the liquid surface level is changed depending on the shape of the ink storing section 300 or the attachment position of the prism 320.

The process for air bubbles is a process to be conducted when it is judged (by the judging method described above with reference to FIG. 11 and the like) that the peak of the detection voltage by the air bubbles is larger than the peak by reflected light from the incidence plane EF of the prism 320. For example, the process for air bubbles is a process of excluding the detection voltage of the ink cartridge, in which adhesion of air bubbles is detected, from a target of the process in the sensitivity correction process described below with reference to FIG. 14 and the like. Alternatively, the process for air bubbles is a process in which existence or non-existence of ink is determined based on dot count in a case where adhesion of air bubbles is detected, and existence or non-existence of ink is determined based on the reflected light of the prism 320 and the dot count in a case where adhesion of air bubbles is not detected, in the ink near end state detection process described below with reference to FIG. 13.

Also, according to the present embodiment, as described above with reference to FIG. 11 and the like, the control section 100 conducts peak detection of the detection voltage (signal of light reception results) in the measurement region Ra and the measurement region Rb, respectively, which are divided based on the estimated positions P1'-P4' (detection position) of the prism 320, and determines whether the process for air bubbles is to be conducted or not based on information regarding the distance between the first peak Pa (or Pa', Pa") detected in the first measurement region Ra and the second peak Pb (or Pb', Pb") detected in the second measurement region Rb.

In this manner, as described with reference to FIG. 11 or FIG. 12, the two peaks Pa, Pb are detected by conducting peak detection in the two measurement regions Ra, Rb, and thereby an adhesion state of air bubbles in the prism 320 can be determined based on the information regarding the two peaks. Also, as described with reference to FIG. 12, the adhesion state of air bubbles can be accurately judged by dividing the measurement region into two regions even in a case where there is displacement between the estimated position of the carriage 20 (the position corrected by the position correcting section 110) and the actual position or a case where the peaks by air bubbles are not bilaterally symmetric. Specifically, when the peak by air bubbles is detected in at least one of the two measurement regions Ra, Rb, the distance between the peaks is smaller than the predetermined value, and therefore, adhesion of air bubbles can be judged.

6. Details of Ink Near End State Detection Process

A detailed flow of the ink near end state detection process will be described with reference to FIG. 13 to FIG. 17.

Figure 13:
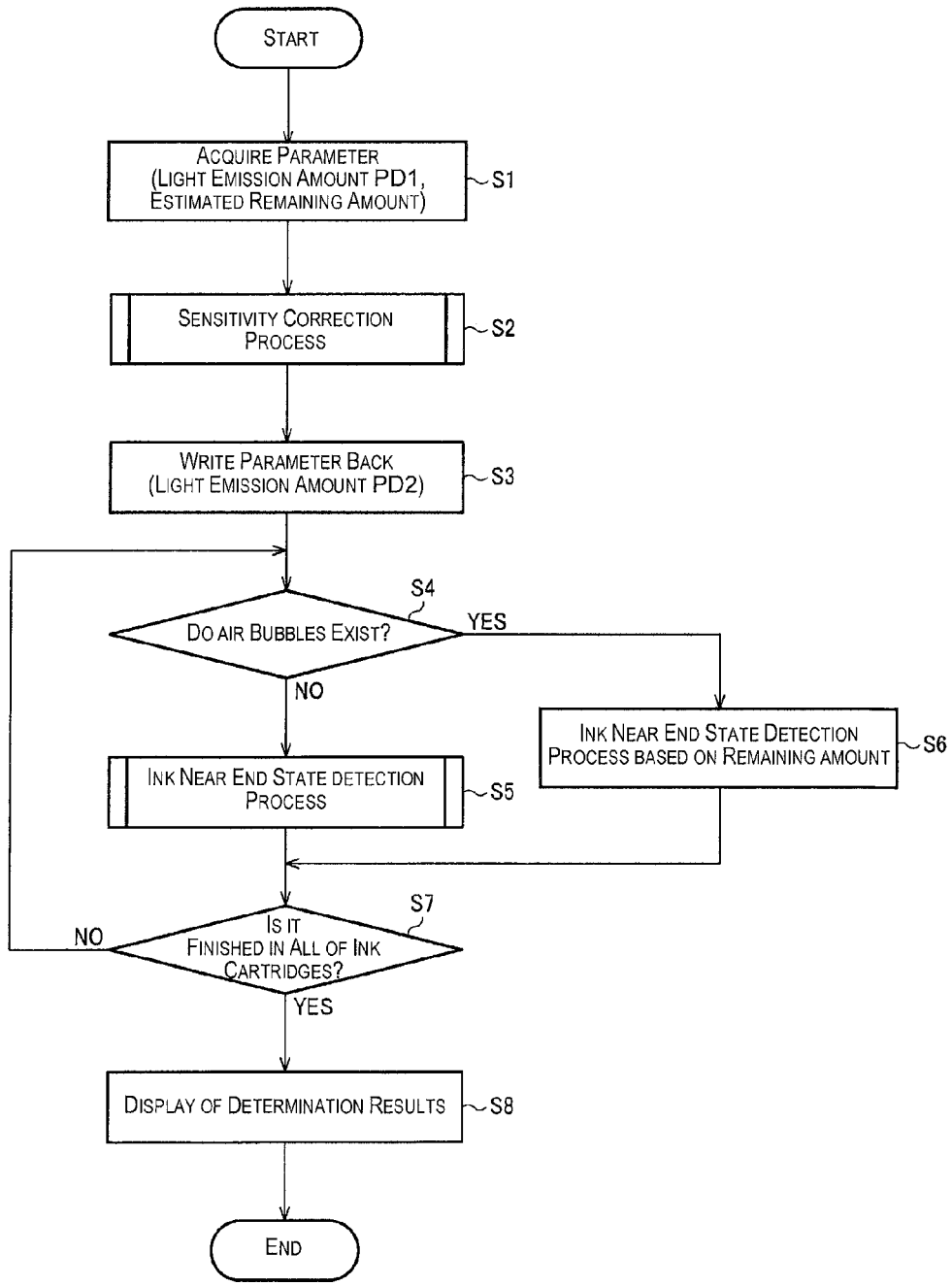
[FIG. 13] A flow chart of an ink near end state detection process.

FIG. 13 shows a flow chart of the ink near end state detection process conducted by the control section 100. This ink near end state detection process is conducted at various timings (predetermined timings) such as a timing when the printing device 200 is started, a timing when the ink cartridges IC1-IC4 are replaced, or a timing when the remaining amount of ink determined by the remaining amount estimation section 160 is equal to or less than a predetermined amount.

When the ink near end state detection process is started, the control section 100 first acquires each parameter used for subsequent processes (step S1). More specifically, the control section 100 acquires a light emission amount PD1 decided in a previous sensitivity correction process from the memory device 352 of each ink cartridge, and acquires an estimated remaining amount of ink in each ink cartridge from the RAM, that is not shown in the drawing, of the control section 100. Since the estimated remaining amount of ink is read out from the memory device 352 of each ink cartridge to the RAM, that is not shown in the drawing, of the control section 100 by the remaining amount estimation section 160 and is renewed sequentially when the power is turned on, the control section 100 can acquire the estimated remaining amount of ink from the RAM, that is not shown in the drawing, of itself.

Next, the light emission amount deciding section 140 and the threshold value deciding section 150 conduct the sensitivity correction process (step S2). In this sensitivity correction process, the light emission amount deciding section 140 conducts a process of deciding a new light emission amount PD2 of the light emitting section 82 (light emission amount used for the ink near end state detection process of step S4), and the threshold value deciding section 150 conducts a process of deciding a threshold value of ink near end state detection. The details of the sensitivity correction process will be described with reference to FIG. 14. Next, the control section 100 writes each new parameter decided in the sensitivity correction process, that is, the new light emission amount PD2 back to the memory device 352 of each ink cartridge (step S3). Also, results of determination of existence or non-existence of air bubbles determined in the sensitivity correction process is stored in the RAM, that is not shown in the drawing, of the control section 100.

Next, the remaining determining section 130 reads out the results of determination of existence or non-existence of air bubbles from the RAM, that is not shown in the drawing, of the control section 100 (step S4). When there are no air bubbles in the ink cartridge that is the target of the process, the remaining determining section 130 conducts the ink near end state detection process to this ink cartridge (step S5). In this process, an ink near end state is determined based on determination of the threshold value of the detection voltage using the threshold value decided in the sensitivity correction process and determination on whether the estimated remaining amount reaches a predetermined value or not. The details of the ink near end state detection process will be described below with reference to FIG. 17. In step S4, when there are air bubbles in the ink cartridge that is the target of the process, an ink near end state is detected based on the remaining amount of ink estimated by the remaining amount estimation section 160 (step S6). In this detection process, for example, similar processes to steps S45-S48 of FIG. 17 described below are conducted. This process conducted when there are air bubbles is referred to as the process for air bubbles. Next, it is determined whether ink near end state detection is finished in all of the ink cartridges IC1-IC4 or not (step S7). In a case where near end state detection is not finished in all of the ink cartridges, step S4 is conducted again to the next ink cartridge as the target of the process. In a case where ink near end state detection is finished in all of the ink cartridges, a process of displaying the determination results on the display section 210 (step S8), and the process of this flow is finished.

Here, steps S1-S3 (process of setting parameters for ink near end state detection) of this flow may be conducted when the power of the printing device is turned on or when the ink cartridges are replaced. Also, steps S4-S8 (actual process of ink near end state detection) of this flow may be conducted at a predetermined timing between printing jobs or during printing as well as when the power of the printing device is turned on or when the ink cartridges are replaced.

Figure 14:
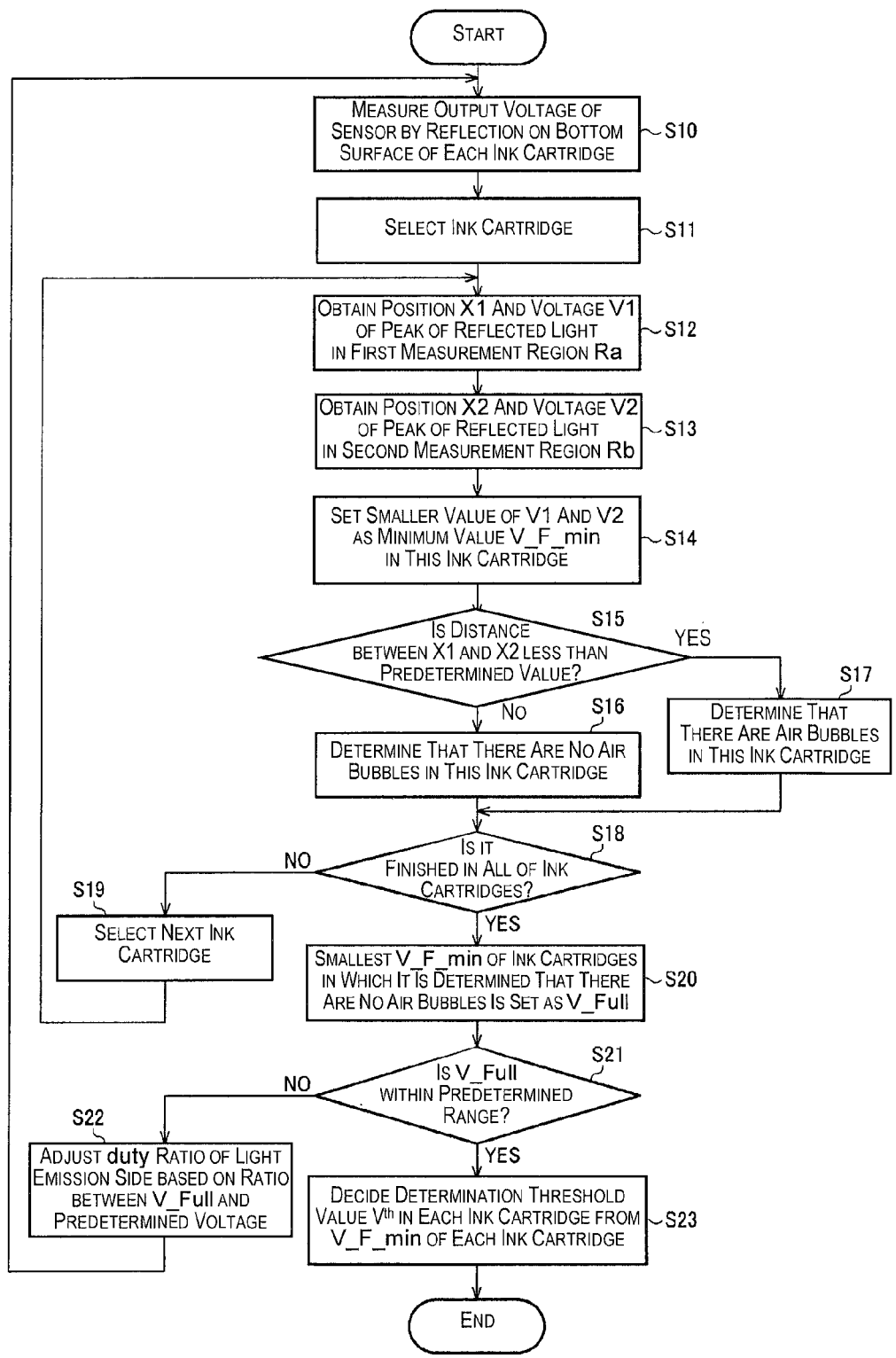
[FIG. 14] A detailed flow chart of a sensitivity correction process.

FIG. 14 shows a flow chart of the sensitivity correction process conducted by the control section 100. When the sensitivity correction process is started, the light emitting section 82 is caused to emit light with the light emission amount PD1, and the detection voltage by reflected light from the prism of each ink cartridge is acquired (step S10). Next, the light emission amount deciding section 140 selects one ink cartridge as the target of the process among the ink cartridges IC1-IC4 (step S11). For example, the light emission amount deciding section 140 selects the ink cartridge IC1. In this selection of an ink cartridge, an ink cartridge in which an ink near end state has been already determined in the previous ink near end state detection process is excluded. With respect to an ink cartridge in which an ink near end state has been determined, the memory device 352 of this ink cartridge stores completion of the ink near end state determination, and thereby the control section 100 can know whether or not ink near end state determination has been conducted with respect to each ink cartridge.

Figure 15:
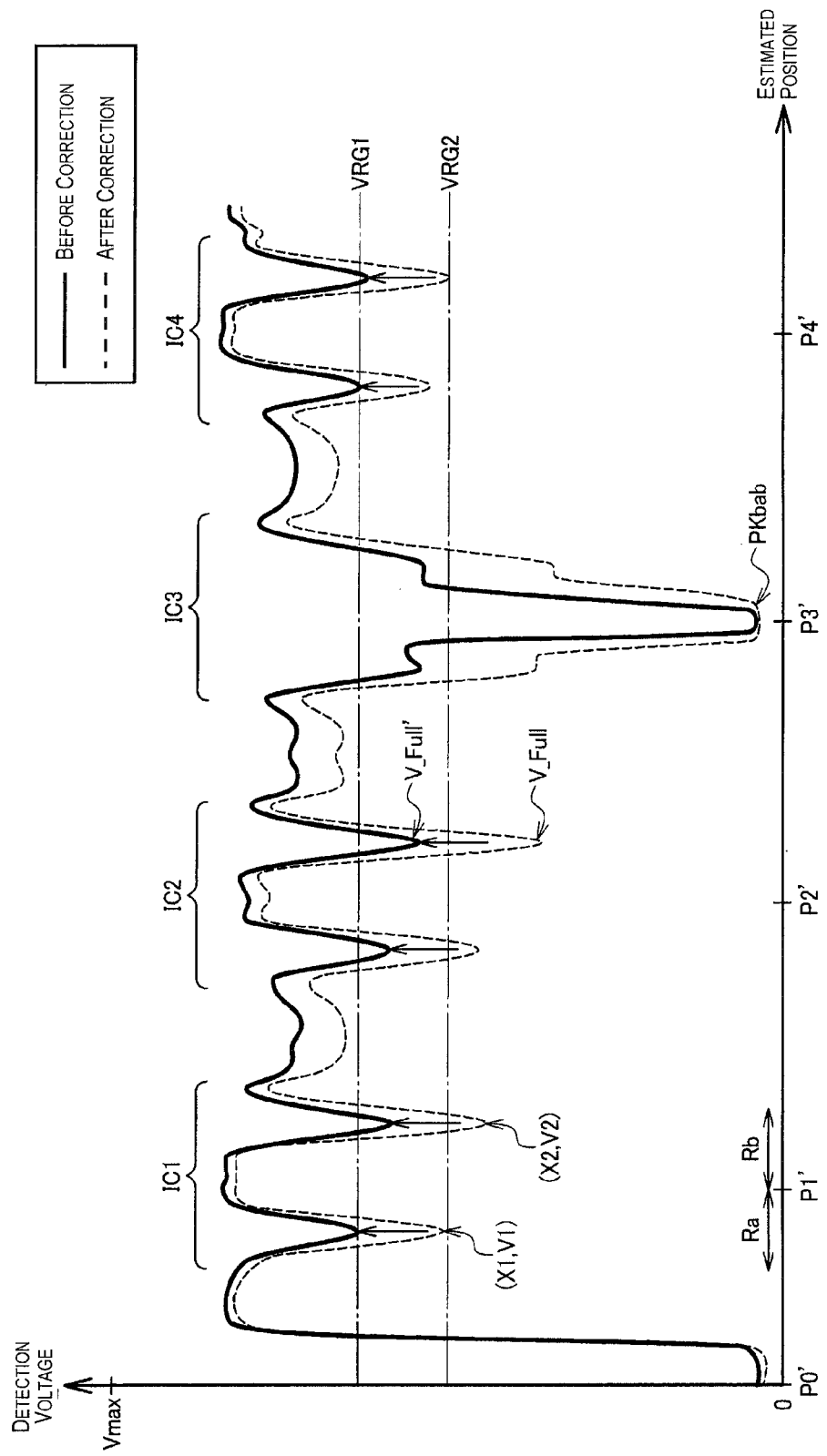
[FIG. 15] A diagram that explains control of a light emission amount in the sensitivity correction process.

FIG. 15 shows an example of the characteristics of the detection voltage acquired in step S15. The position correcting section 110 obtains the corrected positions P0'-P4' based on the detection voltage. As shown in FIG. 15, the light emission amount deciding section 140 obtains a peak position X1 and a peak voltage V1 of the detection voltage in the first measurement region Ra (step S12). Next, the light emission amount deciding section 140 obtains a peak position X2 and a peak voltage V2 of the detection voltage in the second measurement region Rb (step S13). Next, the light emission amount deciding section 140 sets a smaller value among the peak voltages V1, V2 as a minimum value V_F_min of the detection voltage in the ink cartridge that is the target of the process (step S14).

Next, the air bubble judging section 120 determines whether the distance between the peak positions X1, X2 is less than a predetermined value or not (step S15). The air bubble judging section 120 determines that there are no air bubbles in the prism 320 of the ink cartridge that is the target of the process in a case where the distance is not less than the predetermined value (step S16). On the other hand, the air bubble judging section 120 determines that there are air bubbles in the prism 320 of the ink cartridge that is the target of the process in a case where the distance is less than the predetermined value (step S17). Next, it is determined whether determination of existence or non-existence of air bubbles is finished in all of the ink cartridges IC1-IC4 or not (step S18). In a case where determination of existence or non-existence of air bubbles is not finished in all of the ink cartridges, the next ink cartridge that is the target of the process is selected (step S19), and steps S12-S18 are conducted. In the example of FIG. 5, it is determined that there are air bubbles in the ink cartridge IC3 in this process. In a case where determination of existence or non-existence of air bubbles is finished in all of the ink cartridges, the smallest V_F_min among V_F_min of the ink cartridges in which it is determined that there are no air bubbles is set as V_Full (step S20).

Next, the light emission amount deciding section 140 determines whether the V_Full is within a predetermined voltage range or not (step S21). As shown in FIG. 15, for example, in a case where V_F_min of the ink cartridge IC2 is the smallest, the V_F_min is set as V_Full, and it is determined whether the V_Full is within a predetermined voltage range of VRG1-VRG2 or not. In a case where the V_Full is not within the predetermined voltage range, the light emission amount deciding section 140 adjusts the duty of PWM waveforms for controlling the light emission amount based on the ratio between the V_Full and a predetermined voltage (step S22), and conducts step S10-S21 again with the adjusted light emission amount. The predetermined voltage is a voltage within the range of VRG1-VRG2, and for example, it is an average value of VRG1 and VRG2. With this adjustment of the light emission amount, as shown in FIG. 15, the smallest value V_Full of the detection voltage obtained from the ink cartridge in which there are no air bubbles becomes V_Full' in the predetermined voltage range of VRG1-VRG2. In this manner, by excluding an ink cartridge in which it is determined that there are air bubbles from the target of the adjustment of the light emission amount, the light emission amount can be prevented from becoming extremely small.

Figure 16:
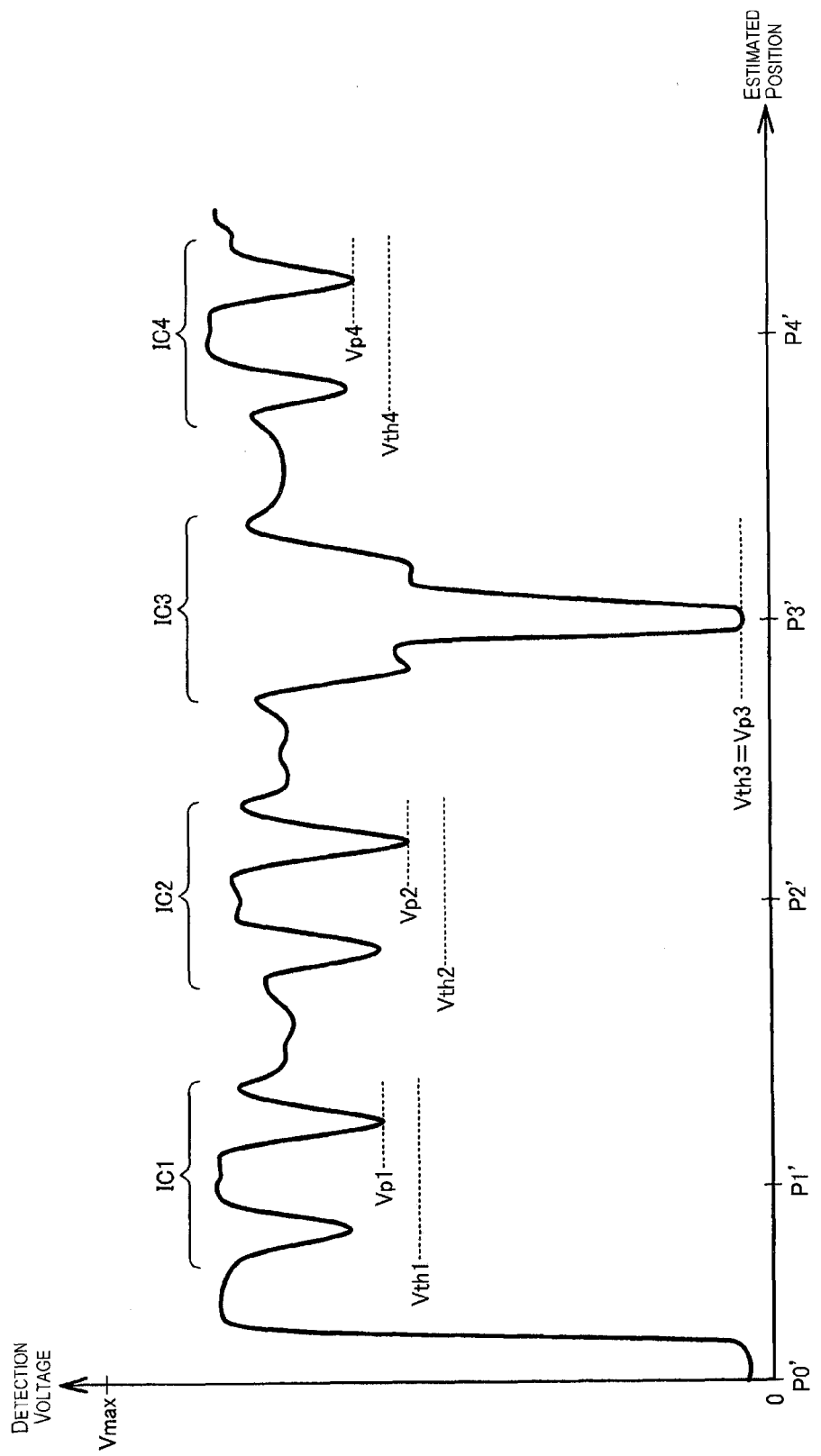
[FIG. 16] A diagram that explains setting of a threshold value in the sensitivity correction process.

In a case where the V_Full is within the predetermined voltage range of VRG1-VRG2, as shown in FIG. 16, the threshold value deciding section 150 decides determination threshold values Vth1-Vth4 of the ink cartridges IC1-IC4 based on V_F_min of each ink cartridge. For example, the determination threshold value is obtained by Vth=V_F_min×α+β. α is a predetermined coefficient, and β is a predetermined offset value. α and β may be set in view of S/N of the detection voltage, the difference in the peak values of the detection voltage between existence and non-existence of ink. As in the ink cartridge IC3 of FIG. 16, in a case where a peak value Vp3 of the detection voltage is a lower limit voltage of the detection voltage, it is set to be Vth3=Vp3.

Figure 17:
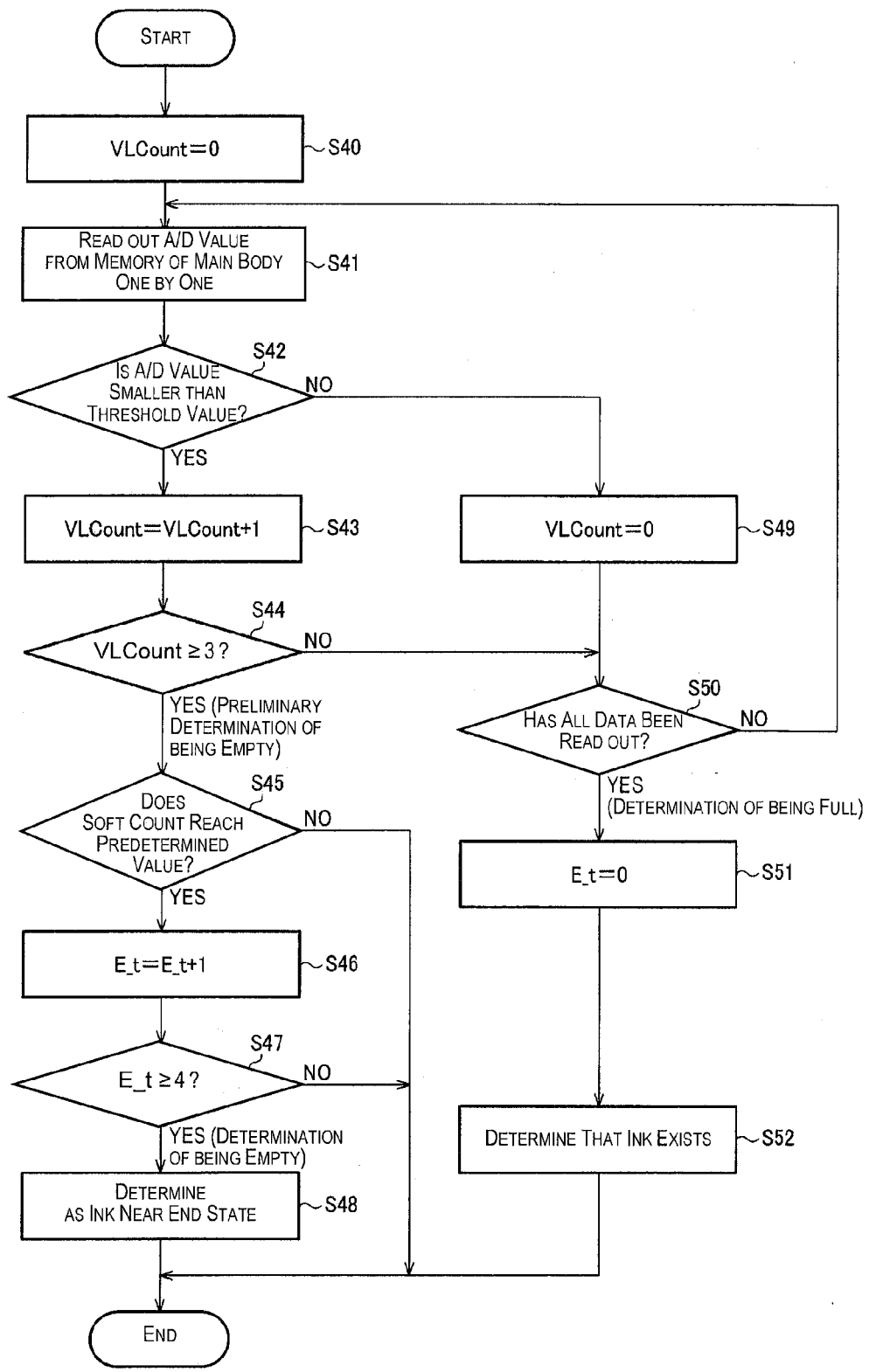
[FIG. 17] A detailed flow chart of the ink near end state detection process.

FIG. 17 is a detailed flow chart of the ink near end state detection process. When this process is started, the control section 100 measures the detection voltage with the light emission amount decided in step S2. The A/D convertor section 70 acquires a sampling voltage, and outputs it to the RAM, that is not shown in the drawing, of the control section 100. The remaining determining section 130 clears a count value VLCount for determining the threshold value to be "0" (step S40). Next, the remaining determining section 130 reads out the A/D converted value of the detection voltage stored in the RAM, that is not shown in the drawing, of the control section 100 in the measurement region Ra and the measurement region Rb one by one in a stored order with respect to the ink cartridge that is the target of the process (the ink cartridge IC1 is taken as an example in the following explanation) (step S41).

Next, the remaining determining section 130 determines whether the A/D converted value is smaller than the determination threshold value Vth1 of the ink cartridge IC1 obtained in the sensitivity correction process (step S42). In a case where it is determined that the A/D converted value is smaller than the determination threshold value, the count value VLCount is incremented (step S43). Next, it is determined whether or not the count value VLCount is equal to or greater than 3 (step S44). In a case where the count value VLCount is equal to or greater than 3 (in a case where one lower than the threshold value among the detection voltages sampled in the detection region of the ink cartridge IC1 is equal to or greater than 3), preliminary determination of an empty state (preliminary determination of an ink near end state) is made. The reason why preliminary determination of an empty state is made in a case where the count value VLCount is equal to or greater than 3 is because the A/D converted value might be lower than the threshold value, for example, due to sudden noise caused by static electricity even if it is actually not an ink near end state.

When preliminary determination of an empty state is made, the remaining determining section 130 determines whether or not the estimated remaining amount (soft count value, dot count value) of ink is smaller than a predetermined value (step S45). Here, the predetermined value means an estimated remaining amount value of ink (also referred to as soft count value) that is not determined as an ink near end state in view of the tolerance or the usage environment of the printing device and the ink cartridge. In a case where the estimated remaining amount of ink is not smaller than the predetermined value, the process is ended without determining that ink exists or it is an ink near end state. In a case where the estimated remaining amount of ink is smaller than the predetermined value, a count value E_t of the preliminary determination of an empty state is incremented (step S46). The count value E_t is a count value that is incremented in a case where it is determined that ink does not exist in each of the ink cartridge in the ink near end detection process of step S7 and the estimated remaining amount of ink at the time is smaller than the predetermined value. Next, the remaining determining section 130 determines whether or not the count value E_t is equal to or greater than 4 (step S47). In a case where the count value E_t is not equal to or greater than 4, it is not determined as an ink near end state, and the process is ended. In a case where the count value E_t is equal to or greater than 4, it is determined as an ink near end state (step S48), and the process is ended.

In a case where it is determined that the A/D converted value is not smaller than the determination threshold value in step S42, the count value VLCount is cleared to be "0" (step S49). Next, it is determined whether all the A/D converted values stored in the RAM, that is not shown in the drawing, of the control section 100 have been read out (step S50). In a case where there is an A/D converted value that has not been read out, the process returns to step S41. In a case where all the A/D converted values have been read out, the count value E_t of the preliminary determination of an empty state is cleared to be "0" (step S51), it is determined that ink exists (step S52), and the process is ended.

According to the above-described embodiment, the printing device includes the plurality of ink cartridges IC1-IC4 (the plurality of liquid reservoirs). The control section 100 determines an adhesion state of air bubbles in the prism 320 with respect to each ink cartridge of the plurality of ink cartridges IC1-IC4, and determines that the process for air bubbles is to be conducted in a case where it is determined that air bubbles adhere to the prism 320 with respect to at least one ink cartridge of the plurality of ink cartridges IC1-IC4. In the process for air bubbles, the control section 100 conducts control for adjusting the light emission amount of the light emitting section 82 based on the detection voltage (signal of light reception results) with respect to an ink cartridge of the plurality of ink cartridges IC1-IC4 in which it is determined that no air bubbles adhere to the prism 320. The process for air bubbles is referred to as a process of controlling the light emission amount using the detection voltage of the ink cartridge in which it is determined that no air bubbles adhere.

With this, as described with reference to FIG. 15 and the like, the detection voltage of the ink cartridge in which it is determined that air bubbles are detected in the sensitivity correction process can be excluded from the target of the process. Therefore, since an appropriate light emission amount can be set only from the detection voltage of the ink cartridge in which no air bubbles adhere, the threshold value determination can be conducted securely with respect to the difference in the detection voltage due to existence or non-existence of ink.

According to the present embodiment, the control section 100 determines the adhesion state of air bubbles in the prism 320 at a predetermined timing (every time step S2 of FIG. 13 is conducted). In a case where the control section 100 newly (in the next step S2) determines that no air bubbles adhere to the prism 320 with respect to the ink cartridge in which it has been previously determined that air bubbles adhere to the prism 320, the control section 100 includes the detection voltage (signal of light reception results) with respect to the ink cartridge in which it is newly determined that no air bubbles adhere to the prism 320 as the target of the control for adjusting the light emission amount of the light emitting section 82 (target of the cartridge in which a process of detecting an ink near end state is conducted in the process of FIG. 17).

According to the above-described embodiment, for example, as described with reference to FIG. 13 and the like, the process of detecting an ink near end state is conducted as needed at a predetermined timing such as a timing when a power of the printing device is turned on. As described in S15 to S17 of FIG. 14, determination of existence or non-existence of air bubbles is included in the sensitivity correction process, which means that determination of existence or non-existence of air bubbles is conducted at the predetermined timing.

With this, even if air bubbles adhere to the prism 320 once, if the air bubbles disappear as a printing operation is repeated or the air bubbles disappear spontaneously as time passes, for example, the ink cartridge can be excluded from the process for air bubbles. Consequently, in a case where the adhesion state of air bubbles changes, the process can be returned to a normal process depending on the adhesion state of air bubbles.

According to the present embodiment, the control section 100 determines the remaining state of ink stored in the ink cartridges IC1-IC4 based on the detection voltage (signal of light reception results) and an estimated remaining amount of ink stored in the ink cartridges IC1-IC4. Specifically, the control section 100 makes a preliminary determination on whether ink stored in the ink cartridges IC1-IC4 is in a near end state or not by comparing the detection voltage and the threshold value (S42 to S44 of FIG. 17). In a case where the control section 100 makes a preliminary determination that ink stored in the ink cartridges IC1-IC4 is in a near end state, the control section 100 makes a determination whether the estimated remaining amount reaches a predetermined value or not (S45), and in a case where the estimated remaining amount reaches the predetermined value, the control section 100 makes a final determination that it is in a near end state (S48).

With this, even if there is a possibility that it will be determined as an ink near end state when the detection voltage becomes lower than the threshold value due to air bubbles generated during printing or the like, false detection of an ink near end state can be prevented because it is not determined as an ink near end state if the estimated remaining amount does not reach the predetermined value in step S45. Specifically, the near end state can be determined accurately even if air bubbles adhere after it is determined that there are no air bubbles in step S4 of FIG. 13.

Also, as in the ink cartridge IC3 of FIG. 16, in a case where the peak value of the peak due to air bubbles is a lower limit voltage of the detection voltage, the threshold value is set as the lower limit voltage of the detection voltage, and therefore, it is determined that ink exists in the ink cartridge IC3 in determination of the threshold value although ink actually does not exist. In this respect, according to the present embodiment, since an ink near end state is determined in the ink cartridge in which it is determined that there are air bubbles based on the estimated remaining amount by the dot count (step S6 of FIG. 13), false detection can be prevented.

7. Detecting Section

Figure 18:
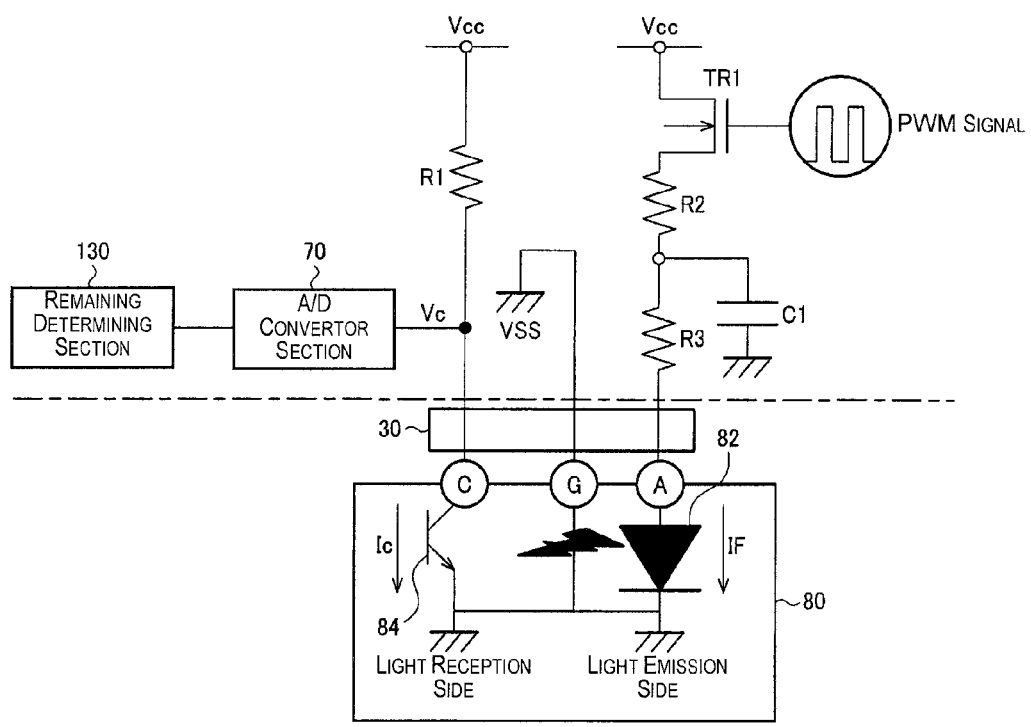
[FIG. 18] A detailed configuration example of a detecting section.

FIG. 18 illustrates a detailed configuration example of the detecting section 80. The detecting section 80 is configured as a reflection-type photo-interrupter, and has the light emitting section 82 and the light receiving section 84. The detecting section 80 has an LED as the light emitting section 82 and a photo transistor as the light receiving section 84. An emitter terminal of the photo transistor is grounded to a ground potential VSS, and a collector terminal is grounded to a power potential Vcc via a resistor element R1.

The potential between the resistor element R1 and the collector terminal is input to the A/D convertor section 70 as an output voltage Vc of the detecting section 80 (detection voltage, or signal of light reception results in a broad sense). The A/D converted output voltage Vc is input to the remaining determining section 130. The light emission amount of light emitted from the light emitting section 82 is set by adjusting a duty ratio (ratio of ON time and OFF time) of a PWM (Pulse Width Modulation) signal, applied to the light emitting section 82 through a transistor TR1, resistor elements R2, R3, and a capacitor C1, by the control section 100. When light emitted from the light emitting section 82 is reflected on the prism 320 in the ink cartridges IC1-IC4 and is received by the light receiving section 84, the output voltage Vc corresponding to the light reception amount is input to the remaining determining section 130 as described below. In the present embodiment, as the light amount received by the light receiving section 84 increases, the output voltage Vc output from the detecting section 80 becomes low.

While the present embodiment has been explained in detail as above, it will be apparent to those skilled in the art that various changes and modifications can be made herein without substantially departing from the subject matter and the effect of the present invention. Therefore, such changes and modifications are included in the scope of the invention. For example, the terms used in the specification or the drawings at least once together with a different term having a broader or similar meaning can be replaced with the different term in any portion of the specification or the drawings. All combinations of the present embodiment and the modified examples are included in the scope of the invention. Also, the configurations and the operations of the liquid reservoir and the liquid consumption device, a method for detecting air bubbles, a method for detecting an ink near end state, and the like are not limited to the present embodiment, and various changes and modifications are possible.

For example, in the above embodiment, a case where the carriage 20 provided with the holder 21 for accommodating the ink cartridges IC1-IC4 in a removable manner moves and the detecting section 80 is fixed to the main body of the printing device was explained as an example. However, the present invention is not limited to this. It is sufficient that the ink cartridges IC1-IC4 and the detecting section 80 move relatively with respect to each other. For example, the carriage 20 provided with the detecting section 80 may move, and the holder 21 for accommodating the ink cartridges IC1-IC4 in a removable manner may be fixed to the main body of the printing device.

Also, in the above embodiment, a case where the present invention is applied to a printing device and an ink cartridge was explained as an example. However, the present invention can be used for a liquid consumption device that sprays or ejects liquid other than ink, and can also be applied to a liquid reservoir that stores such liquid. Further, the liquid reservoir of the present invention can also be used for various kinds of liquid consumption devices provided with a liquid spray head or the like that ejects minute amounts of ink drops. "Ink drops" refer to a state of liquid ejected from the above-described liquid consumption device, and include ones that trail in a grain shape, a tear shape, or a string shape. Also, it is sufficient for the "liquid" described here to be made of the material that can be sprayed by the liquid consumption device. For example, a material in a state of the liquid phase is sufficient, including a liquid body having high or low viscosity, sol, gel water, a fluid body such as an inorganic solvent, an organic solvent, a solution, liquid resin, liquid metal (metal melt), and one in which particles of a functional material consisting of a solid material such as a pigment or metal particles are dissolved, dispersed, or mixed into a solvent, as well as liquid as a state of a material. Also, as a representative example of liquid, ink described in the above embodiment, liquid crystal, and the like can be listed. Here, ink includes common water-based ink, oil-based ink, and various kinds of liquid compositions such as gel ink, hot melt ink, or the like. Specific examples of the liquid consumption device include a liquid crystal display, an EL (electroluminescence) display, a surface emitting display, a liquid consumption device that sprays liquid containing an electrode material or a color material used for manufacturing a color filter in a form of dispersion or dissolution, a liquid consumption device that sprays a living organic material used for manufacturing a biochip, and a liquid consumption device that is used as precision pipette and sprays liquid serving as a sample. Further, it is possible to employ a liquid consumption device that sprays lubricant oil to a precision instrument such as a timepiece or a camera by pinpointing, a liquid consumption device that sprays transparent resin liquid such as ultraviolet curable resin to a substrate for forming a hemispherical micro lens (optical lens) used for an optical communication device or the like, and a liquid consumption device that sprays etching liquid such as acid or alkali for etching of a substrate or the like.

The invention claimed is:

1. A liquid consumption device comprising:
a detecting section including a light emitting section and a light receiving section;
a plurality of liquid reservoirs configured to store liquid, each of the plurality of the liquid reservoirs having a prism therein, which is configured to reflect light emitted from the light emitting section corresponding to a remaining state of the liquid; and
a control section,
the control section being configured to determine an adhesion state of air bubbles in the prism with respect to each of the plurality of the liquid reservoirs, and determine whether a process for air bubbles is to be conducted or not based on a signal of light reception results obtained by receiving reflected light from the prism by the light receiving section, the process for the air bubbles being a process in which the control section controls adjusting a light emission amount of the light emitting section based on the signal of light reception results with respect to at least one of the plurality of the liquid reservoirs in which the control section determines that no air bubbles adhere to the prism, the control section being further configured to determine that the process for air bubbles is to be conducted in a case where the control section determines that air bubbles adhere to the prism with respect to at least one of the plurality of the liquid reservoirs, the control section being further configured to conduct peak detection of the signal of light reception results in each of a first measurement region and a second measurement region set based on a detection position of the prism, and determine whether the process for air bubbles is to be conducted or not based on information regarding a distance between a first peak detected in the first measurement region and a second peak detected in the second measurement region.

2. The liquid consumption device according to claim 1, wherein
the light receiving section receives reflected light from an incidence plane that is a plane where light from the light emitting section enters the prism, and reflected light that enters the inside of the prism through the incidence plane and is reflected from the inside of the prism corresponding to the adhesion state of air bubbles, and the control section determines that the process for air bubbles is to be conducted in a case where the control section judges that the distance between the first peak and the second peak is smaller than a distance between two peaks generated by reflected light from the incidence plane.

3. The liquid consumption device according to claim 2, further comprising:
a holder in which an opening portion is provided in a position that faces the incidence plane of the prism in a case where the liquid reservoirs are installed;
a driving section that moves the holder and the detecting section relatively along a direction in which the light emitting section and the light receiving section are arranged; and
a light shielding section that divides the opening portion into a first opening portion and a second opening portion along a direction in which the holder and the detecting section are moved relatively,
wherein the two peaks generated by reflected light from the incidence plane are a peak obtained by reflection of emitted light from the light emitting section to the first opening portion on the incidence plane and a peak obtained by reflection of emitted light from the light emitting section to the second opening portion on the incidence plane.

4. The liquid consumption device according to claim 1, wherein
the control section conducts peak detection to the signal of light reception results with respect to the at least one of the plurality of the liquid reservoirs in which the control section determines that no air bubbles adhere to the prism, and conducts control for adjusting the light emission amount based on a detected peak value.

5. The liquid consumption device according to claim 1, wherein
the control section determines the adhesion state of air bubbles in the prism at a predetermined timing, and in a case where the control section newly determines that no air bubbles adhere to the prism with respect to the at least one of the plurality of the liquid reservoirs in which the control section has previously determined that air bubbles adhere to the prism, the control section includes the signal of light reception results with respect to the at least one of the plurality of the liquid reservoirs in which the control section newly determines that no air bubbles adhere to the prism as the target of the control for adjusting a light emission amount of the light emitting section.

6. The liquid consumption device according to claim 1, wherein
the control section determines the remaining state of the liquid stored in the plurality of the liquid reservoirs based on the signal of light reception results and an estimated remaining amount of the liquid stored in the plurality of the liquid reservoirs.

7. The liquid consumption device according to claim 6, wherein the control section makes a preliminary determination on whether the liquid stored in the plurality of the liquid reservoirs is in a near end state or not by comparing the signal of light reception results and a threshold value, in a case where the control section makes a preliminary determination that the liquid stored in the plurality of the liquid reservoirs is in a near end state, the control section makes a determination whether the estimated remaining amount reaches a predetermined value or not, and in a case where the control section makes a determination that the estimated remaining amount reaches the predetermined value, the control section makes a final determination that the liquid stored in the plurality of the liquid reservoirs is in a near end state.

8. A method for controlling a liquid consumption device that includes a detecting section having a light emitting section and a light receiving section, and a plurality of liquid reservoirs configured to store liquid, each of the plurality of the liquid reservoirs having a prism therein, the method comprising:
receiving reflected light from the prism that reflects light emitted from the light emitting section corresponding to a remaining state of the liquid, by the light receiving section;
determining an adhesion state of air bubbles in the prism with respect to each of the plurality of the liquid reservoirs;
conducting peak detection of a signal of light reception results obtained by light reception of the light receiving section in each of a first measurement region and a second measurement region set based on a detection position of the prism;
determining whether a process for air bubbles is to be conducted or not based on the signal of light reception results obtained by light reception of the light receiving section, and whether the process for air bubbles is to be conducted or not based on information regarding a distance between a first peak detected in the first measurement region and a second peak detected in the second measurement region, the process for the air bubbles being a process in which the control section controls adjusting a light emission amount of the light emitting section based on the signal of light reception results with respect to at least one of the plurality of liquid reservoirs in which the control section determines that no air bubbles adhere to the prism,
determining that the process for air bubbles is to be conducted in a case of determining that air bubbles adhere to the prism with respect to at least one of the plurality of the liquid reservoirs; and conducting the process for air bubbles in a case of determining that the process for air bubbles is to be conducted.

9. A liquid consumption device comprising:

a detecting section including a light emitting section and a light receiving section;

a holder for accommodating a plurality of liquid reservoirs each of which has a prism configured to reflect light emitted from the light emitting section corresponding to a remaining state of liquid; and a control section, the control section being configured to determine an adhesion state of air bubbles in the prism with respect to each of the plurality of liquid reservoirs, and determine whether a process for air bubbles is to be conducted or not based on a signal of light reception results obtained by receiving reflected light from the prism of the plurality of liquid reservoirs by the light receiving section, the process for the air bubbles being a process in which the control section controls adjusting a light emission amount of the light emitting section based on the signal of light reception results with respect to at least one of the plurality of liquid reservoirs in which the control section determines that no air bubbles adhere to the prism, the control section being further configured to determine that the process for air bubbles is to be conducted in a case where the control section determines that air bubbles adhere to the prism with respect to at least one of the plurality of liquid reservoirs, the control section being further configured to conduct peak detection of the signal of light reception results in each of a first measurement region and a second measurement region set based on a detection position of the prism, and determine whether the process for air bubbles is to be conducted or not based on information regarding a distance between a first peak detected in the first measurement region and a second peak detected in the second measurement region.

* * * * *